United States Patent
Ishizuka et al.

(10) Patent No.: US 7,779,209 B2
(45) Date of Patent: Aug. 17, 2010

(54) SYSTEM CONTROLLER, SNOOP TAG MODIFICATION METHOD AND INFORMATION PROCESSING APPARATUS HAVING SNOOP TAG MODIFICATION FUNCTION

(75) Inventors: Takaharu Ishizuka, Kawasaki (JP);
Toshikazu Ueki, Kawasaki (JP);
Makoto Hataida, Kawasaki (JP);
Takashi Yamamoto, Kawasaki (JP);
Yuka Hosokawa, Kawasaki (JP);
Takeshi Owaki, Kawasaki (JP); Daisuke Itou, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 600 days.

(21) Appl. No.: 11/790,263

(22) Filed: Apr. 24, 2007

(65) Prior Publication Data
US 2008/0046663 A1    Feb. 21, 2008

(30) Foreign Application Priority Data
Aug. 18, 2006   (JP) ............................. 2006-223231

(51) Int. Cl.
G06F 12/00 (2006.01)
G06F 13/00 (2006.01)
G06F 13/28 (2006.01)

(52) U.S. Cl. .................... 711/146; 711/E12.001; 711/E12.033; 711/E12.059

(58) Field of Classification Search .................. 711/146
See application file for complete search history.

(56) References Cited

U.S. PATENT DOCUMENTS

| | | | | | |
|---|---|---|---|---|---|
| 5,428,761 | A | * | 6/1995 | Herlihy et al. | 711/130 |
| 5,590,310 | A | * | 12/1996 | Willenz et al. | 711/146 |
| 5,706,463 | A | * | 1/1998 | Ebrahim et al. | 711/120 |
| 5,829,034 | A | * | 10/1998 | Hagersten et al. | 711/141 |
| 6,928,522 | B2 | * | 8/2005 | Yang | 711/144 |
| 7,225,300 | B1 | * | 5/2007 | Choquette et al. | 711/146 |
| 7,613,885 | B2 | * | 11/2009 | Uehara et al. | 711/146 |
| 2003/0005237 | A1 | | 1/2003 | Dhong et al. | |
| 2004/0225845 | A1 | * | 11/2004 | Kruckemyer et al. | 711/146 |

FOREIGN PATENT DOCUMENTS

JP    2001-43204    2/2001

OTHER PUBLICATIONS

Extended European Search Report, mailed Jan. 22, 2008 and issued in corresponding European Patent Application No. 07107252.4-1229.

* cited by examiner

Primary Examiner—Sheng-Jen Tsai
(74) Attorney, Agent, or Firm—Staas & Halsey LLP

(57) ABSTRACT

In a multiprocessor system, a system controller includes snoop tags which are copy information on cache tags retained by respective CPUs. If the same address is registered in S (Shared state) in the cache tag of each of the CPUs connected to the same CPU bus, the address is registered in S (Shared state) in only any one of the snoop tags corresponding to the CPUs in which the same address is registered.

17 Claims, 24 Drawing Sheets

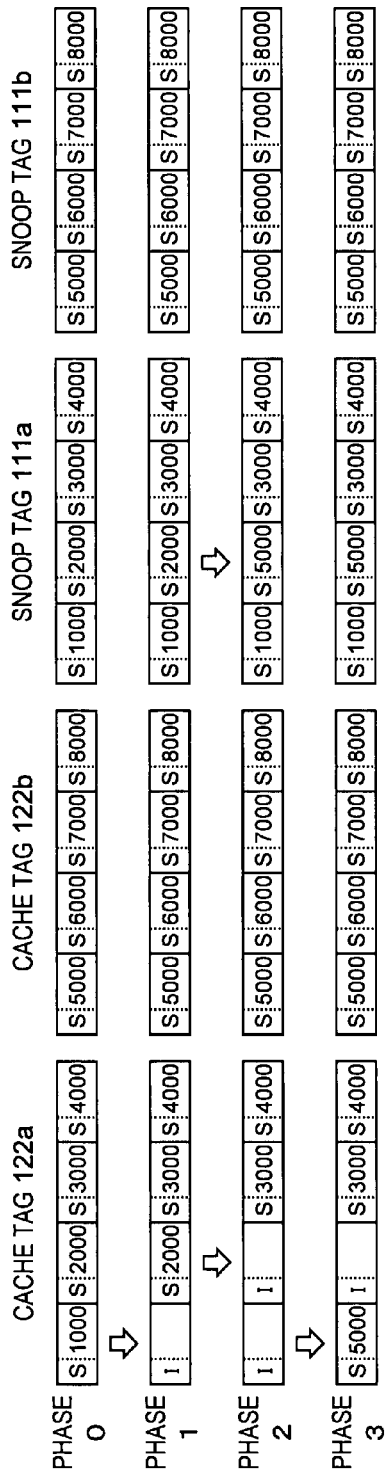
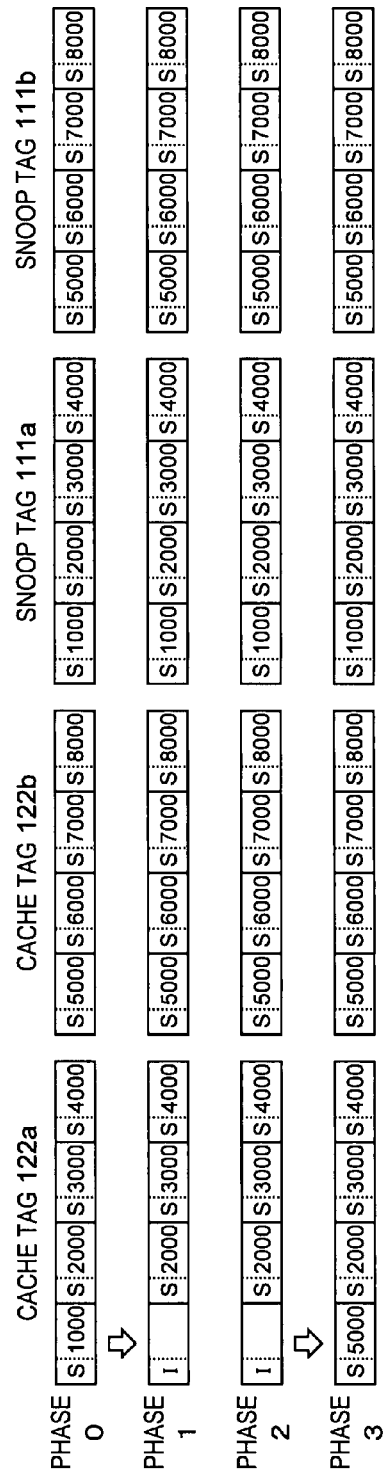
FIG.7A
FIG.7B

| | CACHE TAG 122a | CACHE TAG 122b | SNOOP TAG 111a | SNOOP TAG 111b |
|---|---|---|---|---|
| PHASE 0 | S:1000 \| S:2000 \| S:3000 \| I | S:5000 \| S:6000 \| S:7000 \| S:8000 | S:1000 \| S:2000 \| S:3000 \| I | S:5000 \| S:6000 \| S:7000 \| S:8000 |
| PHASE 1 | S:1000 \| S:2000 \| S:3000 \| I | S:5000 \| S:6000 \| S:7000 \| S:8000 | S:1000 \| S:2000 \| S:3000 \| I | S:5000 \| S:6000 \| S:7000 \| S:8000 |
| PHASE 2 | ⇨ S:1000 \| S:2000 \| S:3000 \| I | S:5000 \| S:6000 \| S:7000 \| S:8000 | S:1000 \| S:5000 \| S:3000 \| I ⇨ | S:5000 \| S:6000 \| S:7000 \| S:8000 |
| PHASE 3 | S:1000 \| S:2000 \| S:3000 \| S:5000 | S:5000 \| S:6000 \| S:7000 \| S:8000 | S:1000 \| S:5000 \| S:3000 \| I | S:5000 \| S:6000 \| S:7000 \| S:8000 |

FIG.9A

| | CACHE TAG 122a | CACHE TAG 122b | SNOOP TAG 111a | SNOOP TAG 111b |
|---|---|---|---|---|
| PHASE 0 | S:1000 \| S:2000 \| S:3000 \| I | S:5000 \| S:6000 \| S:7000 \| S:8000 | S:1000 \| S:2000 \| S:3000 \| I | S:5000 \| S:6000 \| S:7000 \| S:8000 |
| PHASE 1 | S:1000 \| S:2000 \| S:3000 \| I | S:5000 \| S:6000 \| S:7000 \| S:8000 | S:1000 \| S:2000 \| S:3000 \| I | S:5000 \| S:6000 \| S:7000 \| S:8000 |
| PHASE 2 | ⇨ S:1000 \| S:2000 \| S:3000 \| I | S:5000 \| S:6000 \| S:7000 \| S:8000 | S:1000 \| S:2000 \| S:3000 \| I | S:5000 \| S:6000 \| S:7000 \| S:8000 |
| PHASE 3 | S:1000 \| S:2000 \| S:3000 \| S:5000 | S:5000 \| S:6000 \| S:7000 \| S:8000 | S:1000 \| S:2000 \| S:3000 \| I | S:5000 \| S:6000 \| S:7000 \| S:8000 |

FIG.9B

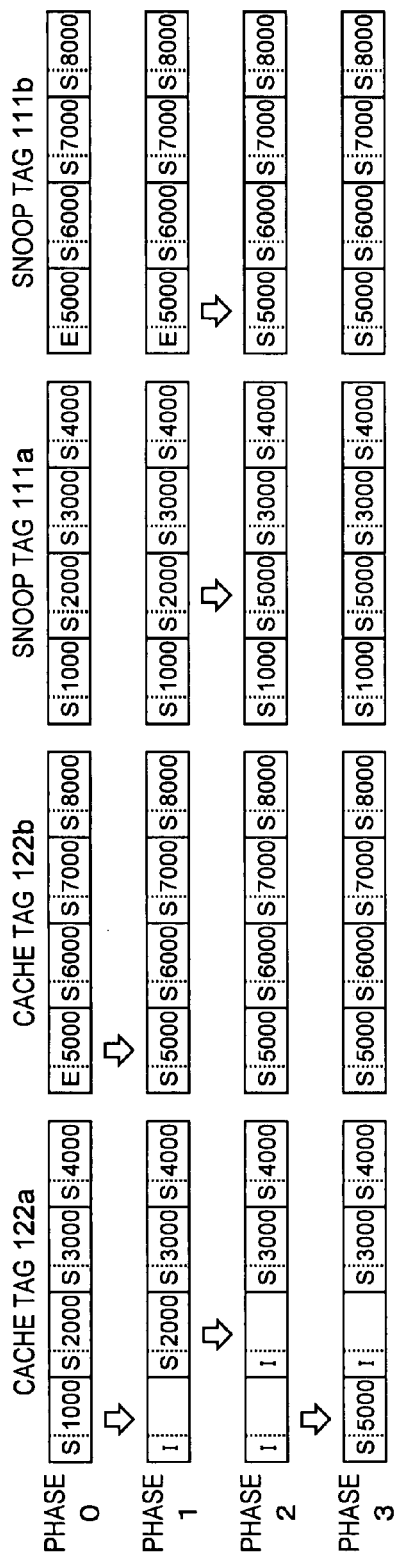
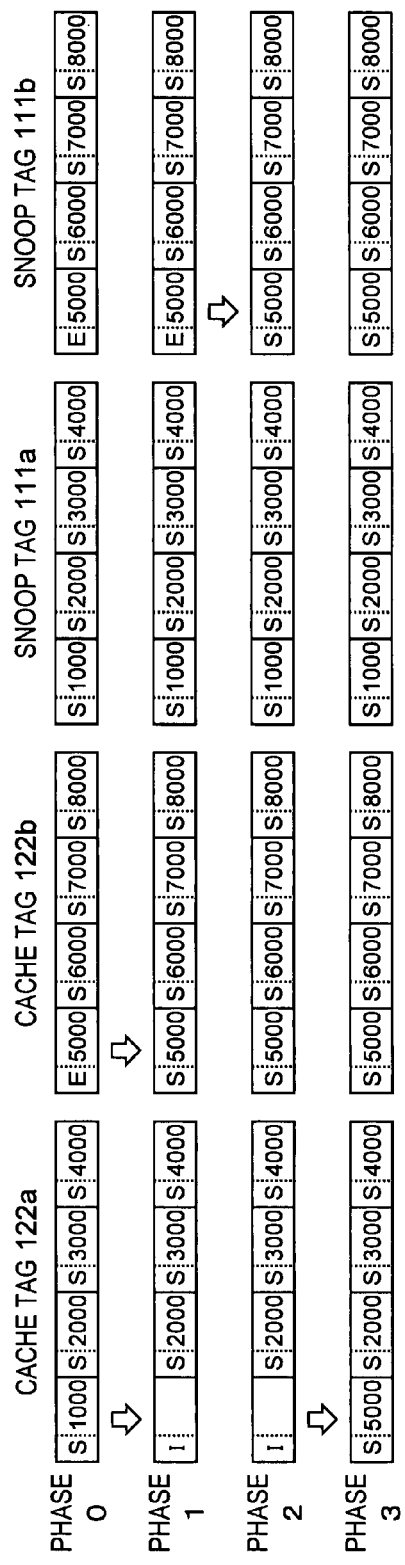
FIG.14A
FIG.14B

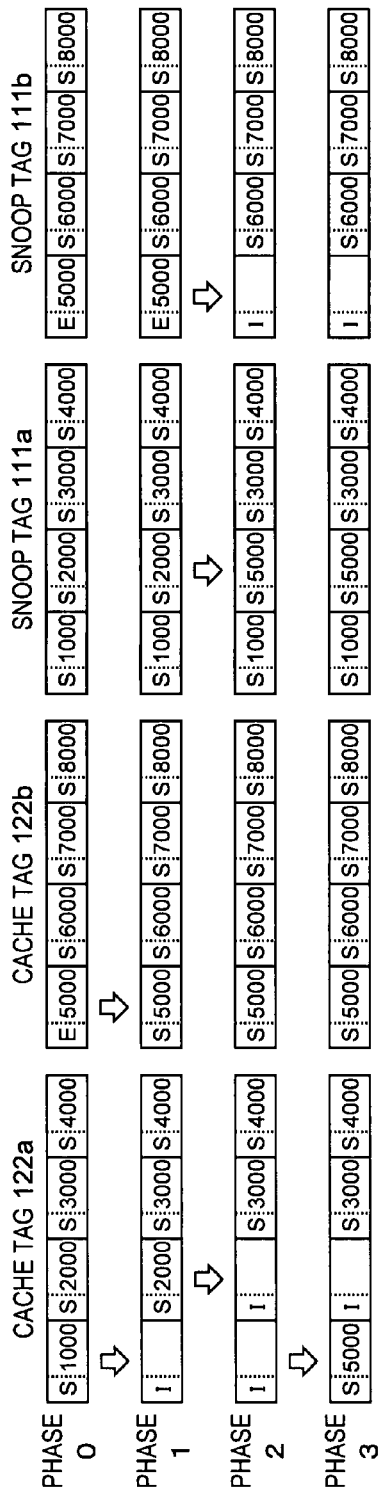
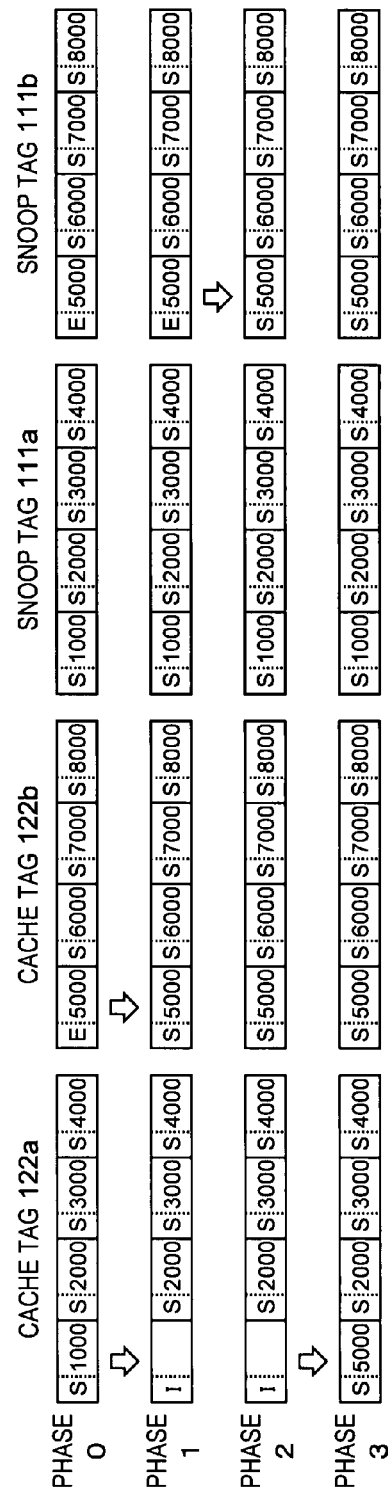
FIG.15A
FIG.15B

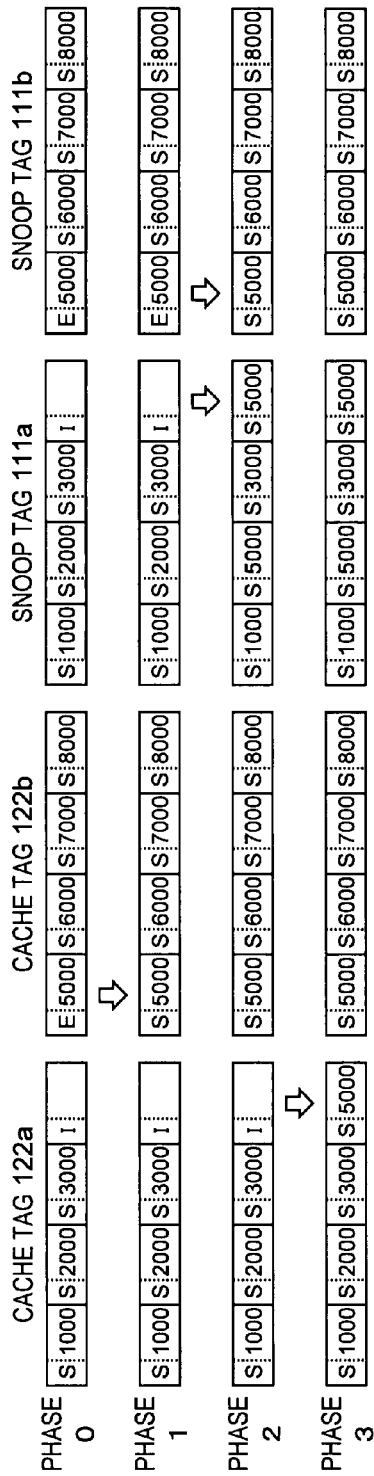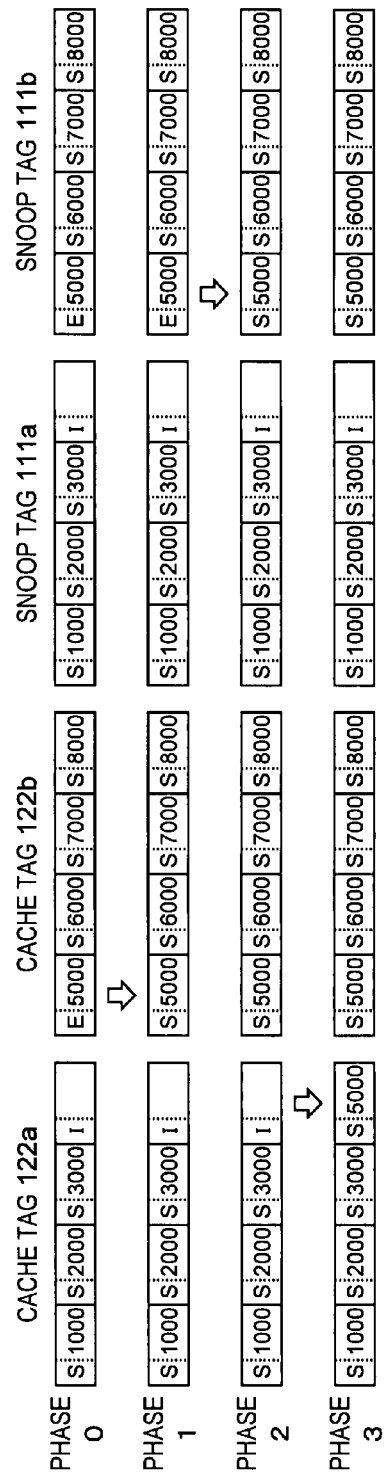
FIG.16A
FIG.16B

SYSTEM CONTROLLER, SNOOP TAG MODIFICATION METHOD AND INFORMATION PROCESSING APPARATUS HAVING SNOOP TAG MODIFICATION FUNCTION

CROSS-REFERENCE TO RELATED APPLICATIONS

This application claims priority from Japanese patent application Serial no. 2006-223231 filed Aug. 18, 2006, the contents of which are incorporated by reference herein.

BACKGROUND OF THE INVENTION

1. Field of the Invention

The present invention relates to a system controller, a snoop tag modification method and an information processing apparatus for controlling a snoop tag having copy information on a cache tag of each CPU to ensure coherency of a cache memory, in a multiprocessor system.

2. Description of the Related Art

In recent years, information processing apparatuses have been extensively used in various areas. Accordingly, high processing capacity of chipsets in multiprocessor configurations has been required more than ever before.

FIG. 23 illustrates an example of a multiprocessor system. In the multiprocessor system shown in FIG. 23, CPUs 520a and 520b are connected to a system controller 510 via a CPU bus 530a, and CPUs 520c and 520d are connected to the system controller 510 via a CPU bus 530c. The CPUs 520a-520d include cache memories 521a-521d and cache tags 522a-522d respectively. In addition, the system controller 510 includes snoop tags 511a-511d corresponding to the cache tags 522a-522d in the respective CPUs 520a-520d.

States and addresses of data stored in the cache memory 521 are recorded in the cache tag 522. Copy information on the corresponding cache tag 522 is recorded in the snoop tag 511.

FIG. 24 shows an example of conventional cache tags/snoop tags. FIG. 24 shows a relationship among the CPU 520a and the CPU 520b which are connected to the same CPU bus 530a shown in FIG. 23 and the system controller 510. Entries of one same index are shown in the cache tag 522a in the CPU 520a, the cache tag 522b in the CPU 520b, and the snoop tag 511a and the snoop tag 511b in the system controller 510. It should be noted that the cache memory 521 is assumed be controlled by a 4-Way set associative method.

The snoop tag 511a in the system controller 510 retains the copy information on the corresponding cache tag 522a. Also, the snoop tag 511b in the system controller 510 retains the copy information on the corresponding cache tag 522b. In FIG. 24, an entry registered in the cache tag 522 has a valid entry in the corresponding snoop tag 511.

A state and an address are described for each entry in the cache tag 522 and the snoop tag 511 shown in FIG. 24. Here, MESI protocol is used for cache coherency. The MESI protocol is one type of cache coherency protocols, and divides each line of the cache into M (Modified) denoting a modified state, E (Exclusive) denoting an exclusive state, S (Shared) denoting a shared state and I (Invalid) denoting an invalid state, then controls them.

FIG. 25 illustrates Eviction. Eviction is to instruct to perform a cache ejection process with respect to the CPU 520 from the system controller 510. Hereinafter, Eviction will be described by using an example of FIG. 25.

First, as shown in phase 0, it is assumed that one same index is blank both in the cache tag 522 and the snoop tag 511. At this point, when the CPU 520 reads a block number A, the block number A is registered in the cache tag 522 and the snoop tag 511 respectively as shown in phase 1. Furthermore, when the CPU 520 continuously reads the same index through a block number B, a block number C and a block number D, they become way-full as shown in phase 2.

In such a way-full state, if the CPU 520 hopes to further read a block number E of the same index, the CPU 520 has to delete any data in the cache tag 522 first. Here, the block number A is to be deleted. If the CPU 520 does not support a cache replacement request, and the state of the block number A is not M (Modified), a silent drop occurs at the block number A in the CPU 520. As shown in phase 3, the block number A is deleted in the cache tag 522. It should be noted that the silent drop is to discard data without notifying others of it.

Similarly, when the system controller 510 receives reading of the block number E from the CPU 520, the system controller 510 will also register the block number E and has to delete any one of data in the snoop tag 511. Here, the block number B is to be deleted. At this point, since there is an inclusion rule of "an entry existing in the cache tag 522 has to exist in the snoop tag 511", the system controller 510 has to cause the CPU 520 to also delete the entry which the system controller 510 has deleted, and thereby needs to issue an ejection request to the CPU 520, as shown in phase 4. This ejection request is referred to as Eviction. Eventually, there will be blank entry in both of the cache tag 522 and the snoop tag 511, and thereby the block number E can be registered in both respectively, as shown in phase 5.

It should be noted that prior art documents describing techniques related to the system controller for ensuring the coherency of the cache memory in the multiprocessor system include, for example, Patent Document 1 (Japanese Patent Laid-Open number 2001-43204). Patent Document 1 describes a technique related to a cache memory control apparatus, which corresponds to the above described system controller 510, for ensuring the coherency of the cache memory by a bus snoop method. However, the technique described in Patent Document 1 cannot solve problems described below.

In the system without the cache replacement request from the CPU 520, the snoop tag 511 in the system controller 510 often has the entry having already been replaced, that is, having been dropped I (Invalid), by the CPU 520 (refer to phase 3 in FIG. 25). Due to this characteristic, even though the CPU 520 is still not way-full, the system controller 510 may misunderstand that the CPU 520 is way-full and issue Eviction (refer to phase 4 in FIG. 25).

Thereby, the system controller 510 happens to issue more data ejection requests than necessary with respect to the CPU 520. Therefore, when the entry subjected to the data ejection request is an entry still being required by the CPU 520, the CPU 520 has to issue a read request to obtain the entry again later at the time when the CPU 520 requires the entry, which has been a major cause of degrading system performance.

SUMMARY OF THE INVENTION

It is an object of the present invention to provide a technique for reducing the number of Evictions by a system controller and preventing degradation in system performance.

The present invention is characterized in that snoop tags corresponding to respective CPUs connected to the same CPU bus are managed in an integrated fashion in the system controller, and when the same address is registered in a shared state in a cache tag of each of the CPUs connected to the same CPU bus, the address is registered in the shared state in only any one of the snoop tags corresponding to the CPUs in which the same address is registered. In other words, the system controller has means for controlling so that the same address in the shared state (Shared) is registered in only any one of the snoop tags of the CPUs connected to the same CPU bus.

Specifically, the present invention manages, in a multiprocessor system, a plurality of CPUs including cache memories including a snoop tag having copy information on a cache tag retained by each CPU for each of the CPUs and, if the same address is registered in each of the CPUs connected to the same CPU bus, registers the address in a shared state in only any one of the snoop tags corresponding to the CPUs in which the same address is registered. Thereby, it is possible to reduce the number of used entries in the snoop tags in the system controller.

Moreover, the present invention may include a request processing section which performs a process with respect to requests from the CPUs. If a read request has been issued from one CPU and an address requested to be read has been registered in the shared state in the snoop tag corresponding to the other CPU connected to the same CPU bus to which the CPU having issued the read request is connected, the request processing section performs a snoop tag modification process of not registering the above described address in the snoop tag corresponding to the CPU having issued the read request. Thereby, the number of Evictions in the snoop tag modification can be reduced with a simple circuit, which can improve system performance.

Moreover, the present invention may include a request processing section which, if a read request has been issued from one CPU and an address requested to be read has been registered in the shared state in the snoop tag corresponding to the other CPU connected to the same CPU bus to which the CPU having issued the read request is connected, performs a snoop tag modification process of changing an entry of the above described address in the snoop tag in which the address requested to be read has been registered to an invalid state, and registers the above described address in the snoop tag corresponding to the CPU having issued the read request. Thereby, the probability of the snoop tag continuously retaining the entry having already been dropped from S (shared state) to I (invalid state) in the cache tag in the CPU can be reduced, which can improve system performance.

Moreover, the present invention may include the request processing section which, if a read request has been issued from one CPU and an address requested to be read has been registered in the shared state in the snoop tag corresponding to the other CPU connected to the same CPU bus to which the CPU having issued the read request is connected, compares numbers of blank entries (numbers of blank Ways) or numbers of used entries (numbers of used Ways) in the snoop tag in which the address requested to be read has been registered and the snoop tag corresponding to the CPU having issued the read request, then, depending on a result of the comparison, determines whether to perform a snoop tag modification process of not registering the above described address in the snoop tag corresponding to the CPU having issued the read request or to perform a snoop tag modification process of changing an entry of the above described address in the snoop tag in which the above described address has been registered to an invalid state and registering the above described address in the snoop tag corresponding to the CPU having issued the read request, and performs the determined snoop tag modification process.

Thereby, it is possible to improve system performance, while maintaining the balance between reducing occurrences of useless Evictions and reducing the probability of the snoop tag continuously retaining the entry having already been dropped from S (shared state) to I (invalid state) in the cache tag in the CPU.

Moreover, the present invention may include the request processing section which, when a cache replacement request has been issued from one CPU, snoops the shared state of the other CPU connected to the same CPU bus to which the CPU having issued the cache replacement request is connected, then as a result, if an address requested for the cache replacement has been registered in the shared state in the CPU other than the CPU having issued the cache replacement request, performs a cache replacement request addressing process of invalidating the issued cache replacement request. Thereby it is possible to prevent a coherency error in the snoop tag which may be caused by the cache replacement request.

Moreover, the present invention may include the request processing section which, when a cache replacement request has been issued from one CPU, snoops the shared state of the other CPU connected to the same CPU bus to which the CPU having issued the cache replacement request is connected, then as a result, if an address requested for the cache replacement has not been registered in the CPU other than the CPU having issued the cache replacement request, performs a cache replacement request addressing process of extending the issued cache replacement request to the cache replacement request from all of the CPUs connected to the same CPU bus to which the CPU having issued the cache replacement request is connected. Thereby it is possible to prevent the snoop tag from continuously retaining the entry of the address having already been dropped to I (invalid state) by the CPU, due to the cache replacement request.

Moreover, the present invention may include the request processing section which, not in the case where a read request has been issued from one CPU, but also the state of the entry of the cache tag in the CPU is modified from E (exclusive state) to S (shared state) in the same CPU bus and one E (exclusive state) is changed into two S (shared state) registrations in the same CPU, performs a snoop tag modification process of having one S (shared state) registration in a corresponding snoop tag. Thereby the above described snoop tag modification process can be applied also in the case of changing the state of the entry from E (exclusive state) to S (shared state).

Moreover, the present invention may include the request processing section which changes a snoop tag modification processing method to be executed when the read request has been issued from the CPU, depending on a mode signal. Thereby, a logic of the snoop tag modification process can be freely changed, which enables a real machine to study performance variation depending on a difference in snoop tag modification methods and also enables an appropriate snoop tag modification processing method to be selected for each multiprocessor system.

The snoop tag modification processing methods which can be selected depending on the mode signal given to the request processing section include at least following methods, for example, in case where a read request in a shared state has been issued from one CPU and the same address has already been registered in the tag of the cache memory of each of the CPUs connected to the same CPU bus; a method of controlling not to register the above described address requested to be read in the snoop tag corresponding to the CPU having issued the read request, a method of controlling to change an entry of the above described address in the snoop tag in which the address requested to be read has been registered to an invalid state and register the above described address in the snoop tag corresponding to the CPU having issued the read request, and a method of registering the same address in the shared state in the multiple snoop tags similarly as the prior art.

According to the present invention, the numbers of blank entries in the snoop tags in the system controller are increased and the usage of the snoop tags can be reduced, which can reduce occurrences of Evictions. When the number of Evictions is reduced, the number of the cases is reduced where necessary data is thrown out of the cache memory in the CPU, which improves system performance.

BRIEF DESCRIPTION OF THE DRAWINGS

FIGS. 7A, 7B, 8A and 8B illustrate examples of snoop tag modification in the first case;

FIGS. 9A, 9B, 10A and 10B illustrate examples of snoop tag modification in the first case;

FIGS. 14A, 14B, 15A and 15B illustrate examples of snoop tag modification in a third case;

FIGS. 16A, 16B, 17A and 17B illustrate examples of snoop tag modification in a fourth case;

DETAILED DESCRIPTION OF THE PREFERRED EMBODIMENT

Hereinafter, an embodiment of the present invention will be described by using the drawings.

Figure 1:
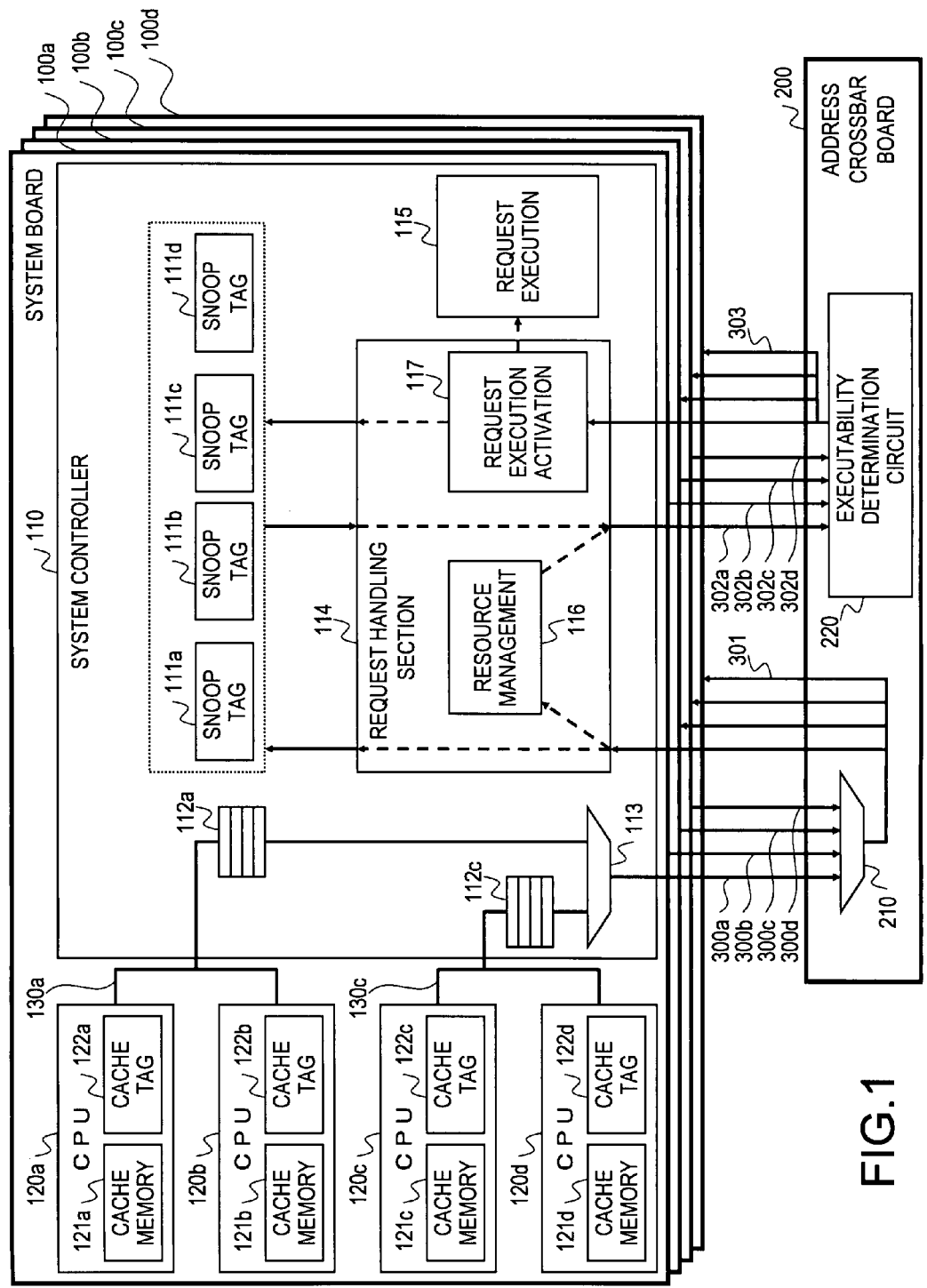
FIG. 1 shows a configuration example of a multiprocessor system in an embodiment of the present invention.

FIG. 1 shows a configuration example of a multiprocessor system according to an embodiment of the present invention. The multiprocessor system shown in FIG. 1 is configured with four system boards 100*a*-100*d* and an address crossbar board 200. The respective system boards 100*a*-100*d* and the address crossbar board 200 are connected via local buses 300*a*-300*d*, a global bus 301, local notification paths 302(*a*-*d*), a global notification path 303 and the like.

The system board 100*a* includes a system controller 110 and four CPUs 120*a*-120*d*. The CPU 120*a* and the CPU 120*b* are connected to the system controller 110 via a CPU bus 130*a*, and the CPU 120*c* and the CPU 120*d* are connected to the system controller 110 via a CPU bus 130*c*. Other system boards 100*b*-100*d* have similar configurations as the system board 100*a*.

The respective CPUs 120*a*-120*d* include cache memories 121*a*-121*d* and cache tags 122*a*-122*d* respectively. In this embodiment, the cache memory 121 is assumed to be controlled by a 4-Way set associative method.

The system controller 110 includes snoop tags 111*a*-111*d*, CPU-issued request queues 112*a* and 112*c*, a local arbiter 113, a request handling section 114 and a request execution section 115.

The snoop tags 111*a*-111*d* correspond to the cache tags 122*a*-122*d* respectively. The CPU-issued request queue 112 retains requests issued by the CPUs 120 for each CPU bus 130. Here, the CPU-issued request queue 112*a* retains the requests issued by the CPUs 120*a* and 120*b*, and the CPU-issued request queue 112*c* retains the requests issued by the CPUs 120*c* and 120*d*. The local arbiter 113 outputs the requests retained in the CPU-issued request queue 112 to the local bus 300*a*.

The request handling section 114 performs a process with respect to the requests sent from the global bus 301. The request handling section 114 includes a resource management section 116 and a request execution activation section 117. The resource management section 116 checks resources and the like for processing the requests. The request execution activation section 117 launches the request execution section 115 or modifies the snoop tags 111.

The address crossbar board 200 includes a global arbiter 210 and an executability determination circuit 220. The global arbiter 210 outputs the requests inputted from the local buses 300*a*-300*d* to all of the system boards 100*a*-100*d* via the global bus 301. The executability determination circuit 220 determines whether a request execution is right or wrong based on notifications inputted from the local notification paths 302*a*-302*d*, and notifies the respective system boards 100*a*-100*d* of the result and information required for the request execution, via the global notification path 303.

Here, operations in the system shown in FIG. 1 will be described, for example, in the case where the CPU 120*a* performs a read request. Here, the CPU 120*a* is assumed to read a block number 1000.

The CPU 120*a* first searches the cache tag 122*a* in order to confirm whether or not data at the block number 1000 exists in its own cache memory 121*a*. As a result of the search, if the CPU 120*a* determines that there is no valid data in its own cache memory 121*a*, the CPU 120*a* issues the read request to the CPU bus 130*a*.

The request issued by the CPU 120*a* is inputted to the global arbiter 210 via the CPU-issued request queue 112*a*, the local arbiter 113 and the local bus 300a. The request inputted to the global arbiter 210 is notified simultaneously to all of the system boards 100a-100d via the global bus 301.

On the system board 100a, the request is inputted to the request handling section 114 from the global bus 301. The request handling section 114 reads the respective snoop tags 111, and checks whether or not there are the sources and the like for processing the request, by the resource management section 116. The results are sent to the executability determination circuit 220 via the local notification path 302a.

The executability determination circuit 220 determines whether the request execution is right or wrong based on the notifications from all of the local notification paths 302a-302d, and notifies the request execution activation section 117 of the result and the information required for the request execution, via the global notification path 303. The request execution activation section 117 modifies the snoop tags 111 or launches the request execution section 115, based on the result of the determination of the request execution being right or wrong and the information required for the request execution.

For example, if the sources have been secured and all results of searching the snoop tags 111 are Invalid, the request execution activation section 117 registers the block number 1000 in the snoop tag 111a. It should be noted that a registered state depends on the issued request. Simultaneously, the request execution section 115 reads the block number 1000 in the memory and sends obtained data to the CPU 120a. The CPU 120a modifies the cache memory 121a and the cache tag 122a.

Moreover, for example, if the sources have been secured and the block number 1000 has been registered in M (Modified) denoting a modified state in the snoop tag 111c as the result of searching the snoop tags 111, the request execution activation section 117 registers the block number 1000 in the snoop tag 111a. It should be noted that the registered state depends on the issued request. Also, the state of the block number 1000 in the snoop tag 111c is changed to S (Shared) denoting a shared state or I (Invalid) denoting an invalid state. The state to be changed at this point depends on the issued request. Simultaneously, the request execution section 115 instructs the CPU 120c to send out M data at the block number 1000, and sends the outputted data to the CPU 120a. The CPU 120a modifies the cache memory 121a and the cache tag 122a, and the CPU 120c modifies the cache tag 122c.

Figure 2:
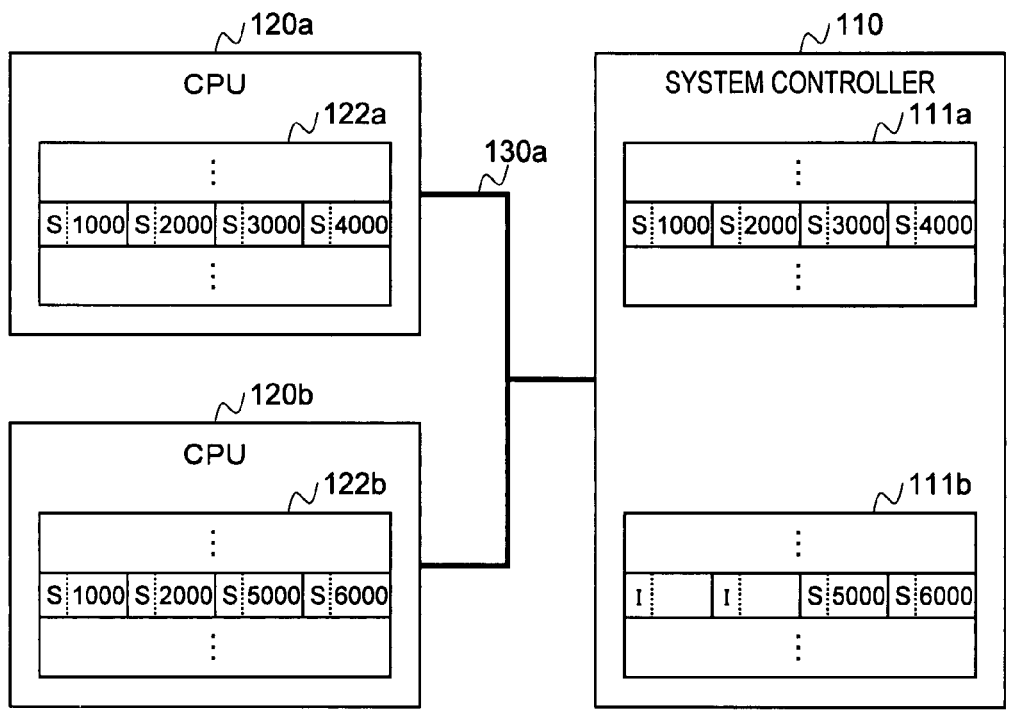
FIG. 2 shows an example of cache tags/snoop tags of this embodiment.

FIG. 2 shows an example of the cache tags/snoop tags of a first case of this embodiment. FIG. 2 shows a relationship among the CPU 120a and the CPU 120b which are connected to the same CPU bus 130a in FIG. 1, and the system controller 110. Entries of one same index are shown in the cache tag 122a in the CPU 120a, the cache tag 122b in the CPU 120b, and the snoop tag 111a and the snoop tag 111b in the system controller 110.

A state and an address are described for each entry in the cache tag 122 and the snoop tag 111 of FIG. 2. Here, MESI protocol is used for cache coherency. The MESI protocol is one type of cache coherency protocols, and divides each line of the cache into M (Modified), E (Exclusive), S (Shared) and I (Invalid) and controls them.

In the snoop tag 111, in principle, copy information on the corresponding cache tag 122 is registered. However, in this embodiment, if a common address has been registered in S (Shared) in the cache tags 122 of the multiple CPUs 120 connected via the same CPU bus 130, the common address is registered in only any one of the corresponding respective snoop tags 111.

In FIG. 2, block numbers 1000 and 2000 have been registered in S (Shared) in both of the cache tag 122a and the cache tag 122b. Since the CPU 120a and the CPU 120b are connected to the same CPU bus 130a, the common address is registered in only any one of the snoop tag 111a and the snoop tag 111b in the system controller 110. In FIG. 2, the common addresses, that is, both of the block numbers 1000 and 2000 have been registered in S (Shared) only in the snoop tag 111a, but not in the snoop tag 111b.

Accordingly, there will be no S (Shared) registration information on the block numbers 1000 and 2000 in the snoop tag 111b. However, if the snoop tag 111 needs to be referred to, for example, due to a request with respect to the block number 1000 from another CPU, since the S (Shared) registration information on the block number 1000 is read out from the snoop tag 111a, there is no effect on the operation even without the S (Shared) registration information at the block number 1000 in the snoop tag 111b. In addition, if a request to purge the cache memory with respect to the block number 1000 has occurred, since the CPU 120a and the CPU 120b are connected to the same CPU bus 130a, the purge request is also processed simultaneously in the CPU 120b due to the purge request with respect to the CPU 120a.

Figure 3:
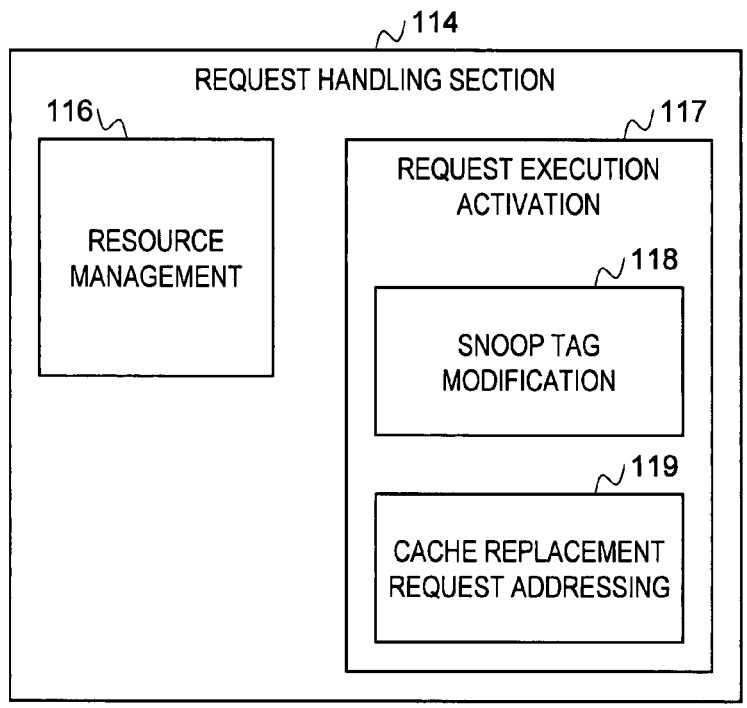
FIG. 3 shows a configuration example of a request processing section of this embodiment.

FIG. 3 shows a configuration example of the request handling section of this embodiment. Also as shown in FIG. 1, the request handling section 114 includes the resource management section 116 and the request execution activation section 117. In addition, the request execution activation section 117 includes a snoop tag modification section 118 and a cache replacement request addressing section 119.

The snoop tag modification section 118 modifies the snoop tags 111. However, also as described in the example of FIG. 2, in this embodiment, in order to manage the respective snoop tags 111 corresponding to the respective CPUs 120 connected to the same CPU bus 130 together in an integrated fashion, the snoop tags 111 are also modified in consideration of such management. In other words, the snoop tag modification section 118 modifies the snoop tags 111 in consideration that the same address may not be registered in the respective snoop tags 111 corresponding to the respective CPUs 120 connected to the same CPU bus 130. Various patterns are conceivable as snoop tag modification patterns of this embodiment. Such patterns will be described in detail later.

In addition, the snoop tag modification section 118 may switch among multiple snoop tag modification patterns including a conventional modification pattern with a mode signal, and execute the modification.

The cache replacement request addressing section 119 performs a process of invalidating a cache replacement request or a process of extending the cache replacement request, in order to address problems which may occur when the cache replacement request is issued. Operations performed by the cache replacement request addressing section 119 in this embodiment will be described in detail later.

The modification of the snoop tags 111 by the snoop tag modification section 118 will be described. Here, for example, in the states of the tags shown in FIG. 2, three patterns of the snoop tag modification will be introduced in the case where the address requested to be read has been registered in S (Shared) in the snoop tag 111b corresponding to the CPU 120b connected to the same CPU bus 130a to which the CPU 120a having issued the read request is connected.

In a snoop tag modification pattern 1, when one CPU 120a issues the read request, if the address requested to be read has been registered in S (Shared) in the snoop tag 111b corresponding to the CPU 120*b* connected to the same CPU bus 130*a* to which the CPU 120*a* having issued the read request is connected, the snoop tag 111*a* corresponding to the CPU 120*a* having issued the read request is not modified. In other words, the address requested to be read is not registered in the snoop tag 111*a* corresponding to the CPU 120*a* having issued the read request.

For example, in FIG. 2, if the CPU 120*a* issues a request to read a block number 5000, since the block number 5000 has been registered in S (Shared) in the snoop tag 111*b* corresponding to the CPU 120*b* connected to the same CPU bus 130*a*, the snoop tag 111*a* corresponding to the CPU 120*a* having issued the read request is not modified.

Figure 4:
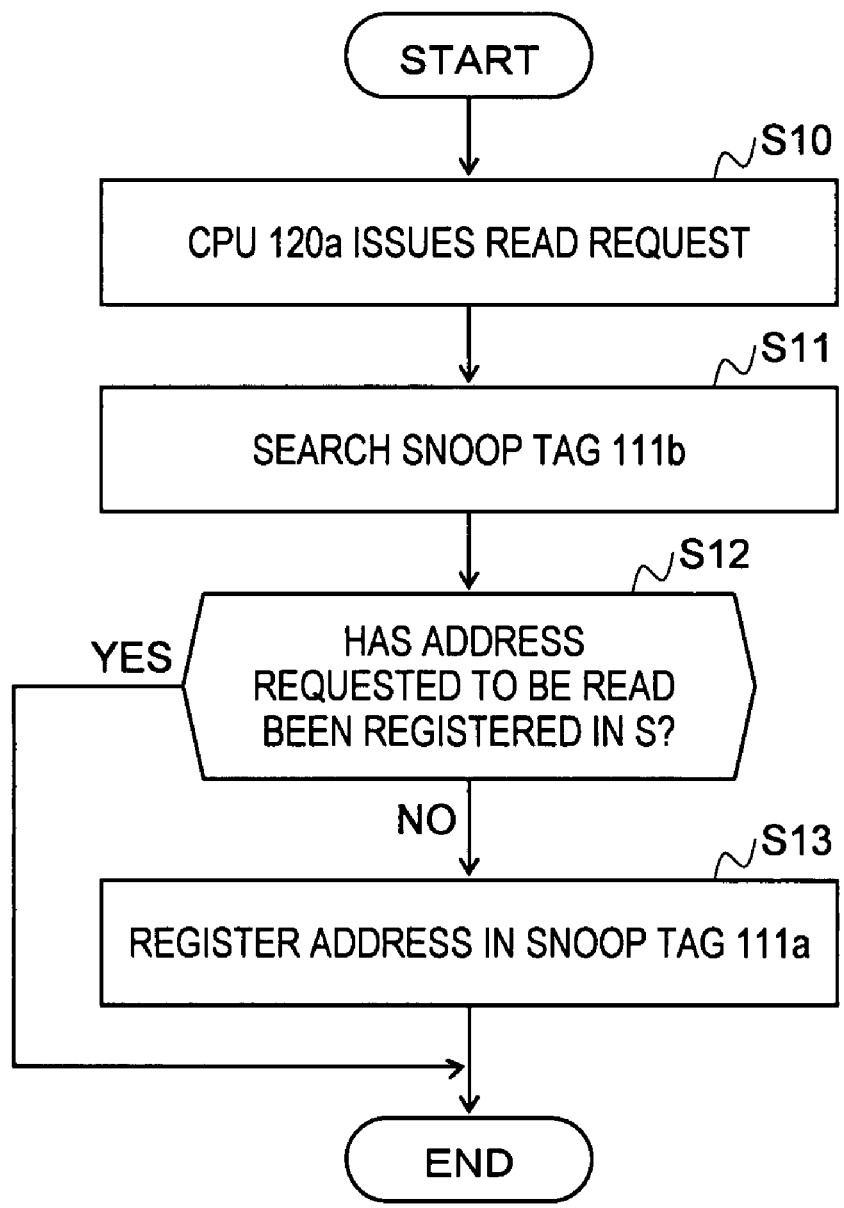
FIG. 4 is a snoop tag modification process flowchart according to a snoop tag modification pattern 1 in a first case.

FIG. 4 is a snoop tag modification process flowchart according to the snoop tag modification pattern 1 in the first case. The CPU 120*a* issues the read request (step S1). The snoop tag 111*b* corresponding to the other CPU 120*b* connected to the same CPU bus 130*a* to which the CPU 120*a* having issued the read request is connected is searched (step S11). As a result of the search, if the address requested to be read has not been registered in S (Shared) (step S12), the address requested to be read is registered in the snoop tag 111*a* corresponding to the CPU 120*a* having issued the read request (step S13). If the address requested to be read has been registered in S (Shared) (step S12), the snoop tag 111*a* corresponding to the CPU 120*a* having issued the read request is not modified.

As just described, in the snoop tag modification pattern 1, it is merely determined whether or not the address requested to be read has been registered in S (Shared) in the snoop tag 111*b*, which can be realized in a simple circuit. In addition, in the snoop tag modification pattern 1, the snoop tag 111*a* corresponding to the CPU 120*a* having issued the read request is not modified if the address requested to be read has been registered in S (Shared) in the snoop tag 111*b*, which can reduce the number of Evictions when modifying the snoop tags and improve system performance.

In a snoop tag modification pattern 2, when one CPU 120*a* issues the read request, if the address requested to be read has been registered in S (Shared) in the snoop tag 111*b* corresponding to the CPU 120*b* connected to the same CPU bus 130*a* to which the CPU 120*a* having issued the read request is connected, the address requested to be read is deleted from the snoop tag 111*b* so that its state is changed to I (Invalid), and the address requested to be read is re-registered in the snoop tag 111*a* corresponding to the CPU 120*a* having issued the read request.

For example, in FIG. 2, if the CPU 120*a* issues the request to read the block number 5000, since the block number 5000 has been registered in S (Shared) in the snoop tag 111*b* corresponding to the CPU 120*b* connected to the same CPU bus 130*a*, the registration is deleted and the block number 5000 is registered in the snoop tag 111*a* corresponding to the CPU 120*a* having issued the read request. At this point, if there is no blank entry in the snoop tag 111*a*, an Eviction function is used.

Figure 5:
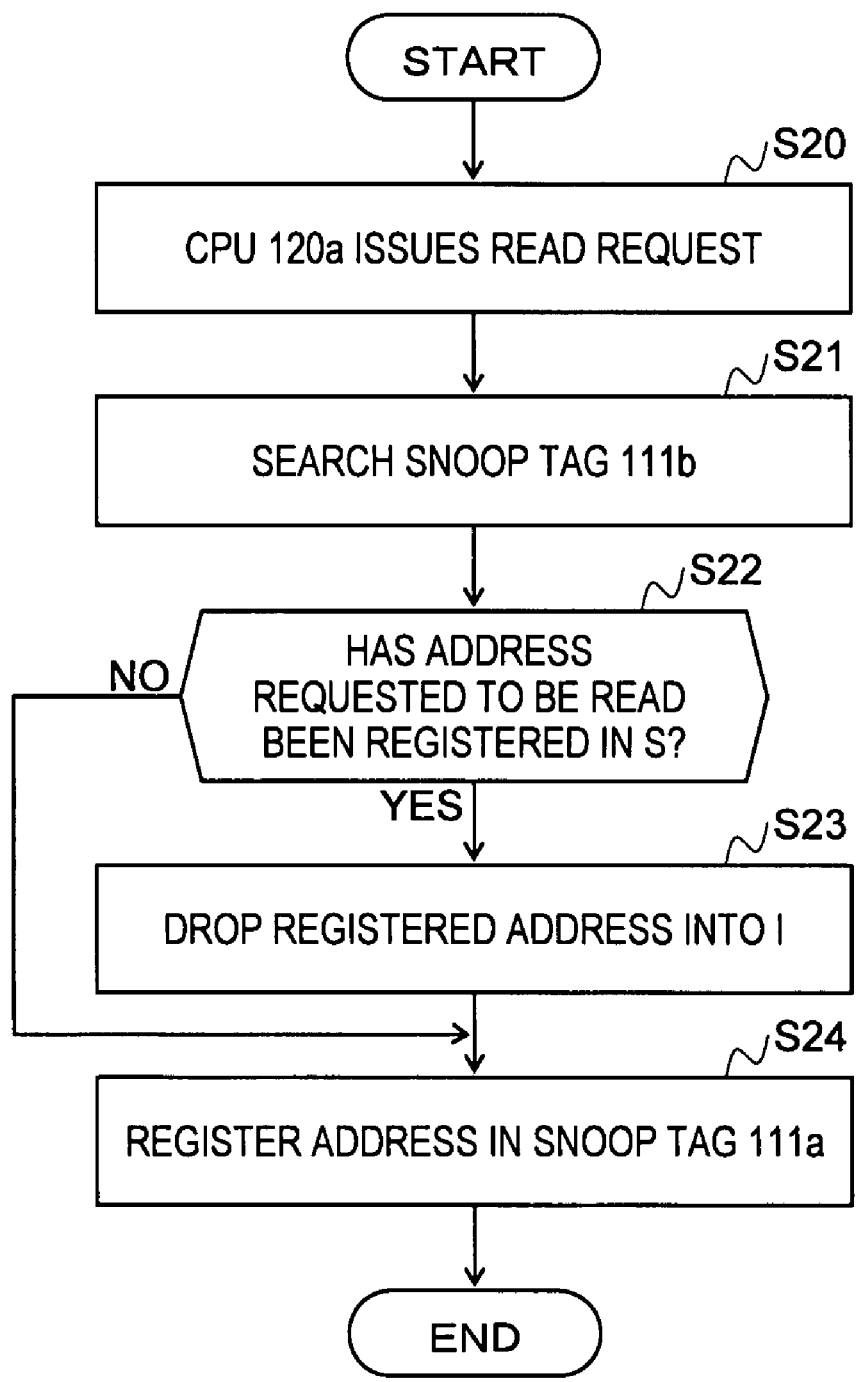
FIG. 5 is a snoop tag modification process flowchart according to a snoop tag modification pattern 2 in the first case.

FIG. 5 is a snoop tag modification process flowchart according to the snoop tag modification pattern 2 in the first case. When the CPU 120*a* issues the read request (step S20), the snoop tag 111*b* corresponding to the other CPU 120*b* connected to the same CPU bus 130*a* to which the CPU 120*a* having issued the read request is connected is searched (step S21). As a result of the search, if the address requested to be read has not been registered in S (Shared) (step S22), the address requested to be read is registered in the snoop tag 111*a* corresponding to the CPU 120*a* having issued the read request (step S24).

As a result of the search, if the address requested to be read has been registered in S (Shared) (step S22), the address registered in the snoop tag 111*b* is changed into I (Invalid) (step S23), and the address requested to be read is registered in the snoop tag 111*a* corresponding to the CPU 120*a* having issued the read request (step S24).

As above described, in the snoop tag modification pattern 2, is registered the address requested to be read in the snoop tag 111*a* corresponding to the CPU 120*a* having issued the first read request, and the corresponding address having already been registered in the snoop tag 111*b* is changed to I (Invalid). Thereby, the probability of the snoop tag 111 continuously retaining the entry having already been changed from S (Shared) to I (Invalid) in the cache tag 122 in the CPU 120 can be reduced, which can improve system performance.

In a snoop tag modification pattern 3, when one CPU 120*a* issues the read request, if the address requested to be read has been registered in S (Shared) in the snoop tag 111*b* corresponding to the CPU 120*b* connected to the same CPU bus 130*a* to which the CPU 120*a* having issued the read request is connected, the snoop tag 111 in which the address requested to be read is registered is determined, based on the number of blank entries (or the number of used entries) in the snoop tag 111*a* corresponding to the CPU 120*a* having issued the read request and the number of blank entries (or the number of used entries) in the snoop tag 111*b*. For example, the snoop tag 111 having a larger number of blank entries is determined as the snoop tag 111 in which the address requested to be read is registered.

For example, in FIG. 2, if the CPU 120*a* issues the request to read the block number 5000, since the block number 5000 has been registered in S (Shared) in the snoop tag 111*b* corresponding to the CPU 120*b* connected to the same CPU bus 130*a*, the numbers of blank entries in the snoop tag 111*a* corresponding to the CPU 120*a* having issued the read request and the snoop tag 111*b* are compared.

Here, the snoop tag 111 in which the address is registered is determined on the condition that "the address requested to be read is registered in the snoop tag 111*a* if the number of blank entries in the snoop tag 111*a* is larger than or equal to the number of blank entries in the snoop tag 111*b* (wherein the entry at the block number 5000 is regarded as a blank entry), and the address requested to be read is registered in the snoop tag 111*b* if the number of blank entries in the snoop tag 111*a* is less than the number of blank entries in the snoop tag 111*b*".

As shown in FIG. 2, the number of blank entries in the snoop tag 111*a* is 0, and the number of blank entries in the snoop tag 111*b* is 3 (including the entry at the block number 5000). Since the number of blank entries in the snoop tag 111*b* is larger, the snoop tag 111*a* is not modified. In other words, the address requested to be read is not registered in the snoop tag 111*a* corresponding to the CPU 120*a* having issued the read request.

If the number of blank entries in the snoop tag 111*a* is larger, the registration at the block number 5000 in the snoop tag 111*b* is dropped to I (Invalid), and the block number 5000 is registered in the snoop tag 111*a* corresponding to the CPU 120*a* having issued the read request.

Figure 6:
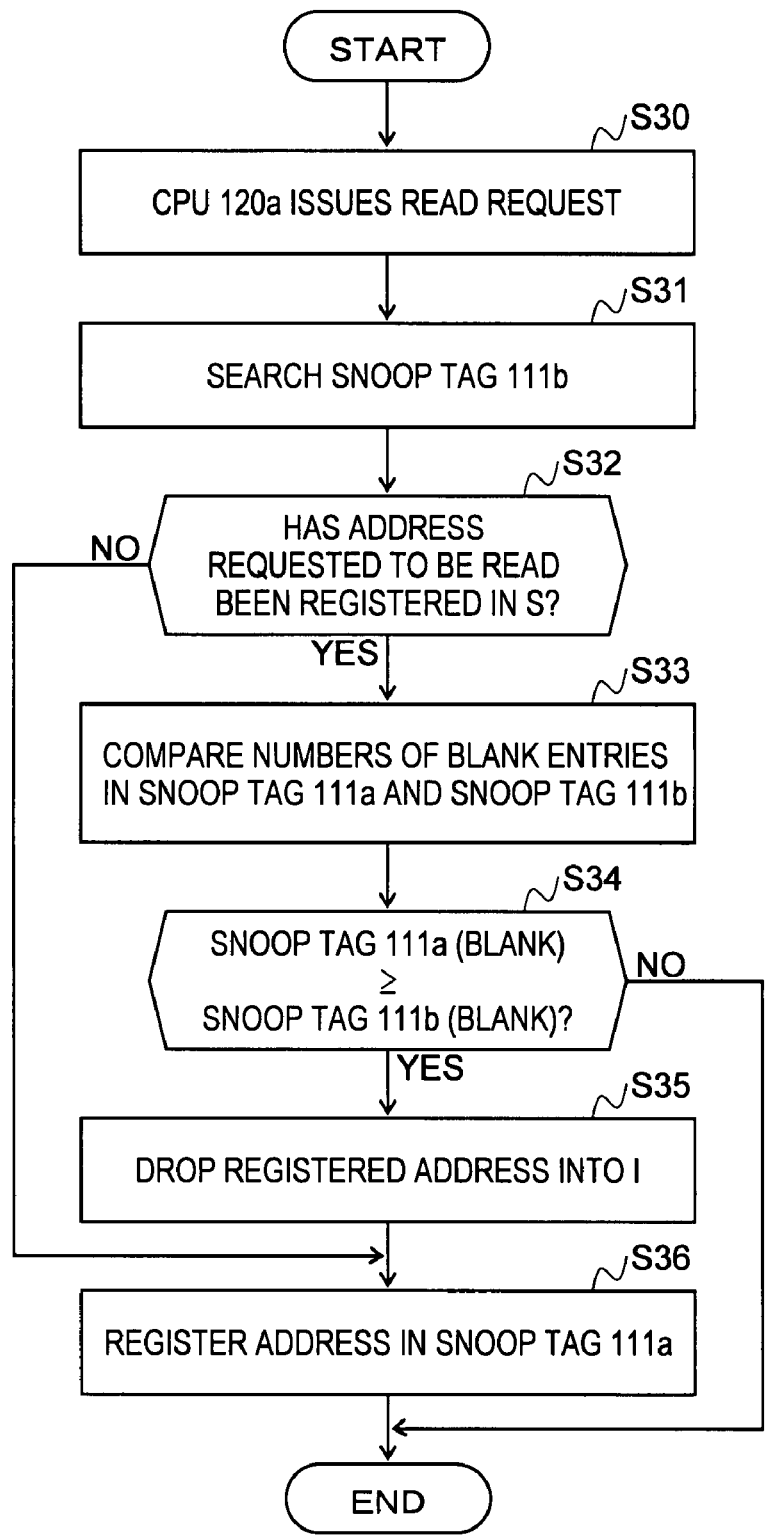
FIG. 6 is a snoop tag modification process flowchart according to a snoop tag modification pattern 3 in the first case.

FIG. 6 is a snoop tag modification process flowchart according to a snoop tag modification pattern 3 in the first case. When the CPU 120*a* issues the read request (step S30), the snoop tag 111*b* corresponding to the other CPU 120*b* connected to the same CPU bus 130*a* to which the CPU 120*a* having issued the read request is connected is searched (step S31). As a result of the search, if the address requested to be read has not been registered in S (Shared) (step S32), the address requested to be read is registered in the snoop tag 111a corresponding to the CPU 120a having issued the read request (step S36).

As a result of the search, if the address requested to be read has been registered in S (Shared) (step S32), the number of blank entries in the snoop tag 111a corresponding to the CPU 120a having issued the read request and the number of blank entries in the snoop tag 111b are compared (step S33). Here, it should be noted that the entry in which the address requested to be read has been registered in the snoop tag 111b is regarded as the blank entry.

If the number of blank entries in the snoop tag 111a is larger than or equal to the number of blank entries in the snoop tag 111b (step S34), the address registered in the snoop tag 111b is changed to I (Invalid) (step S35). The address requested to be read is registered in the snoop tag 111a corresponding to the CPU 120a having issued the read request (step S36).

If the number of blank entries in the snoop tag 111a is less than the number of blank entries in the snoop tag 111b (step S34), the snoop tag 111a corresponding to the CPU 120a having issued the read request is not modified.

In this way, since the snoop tag modification pattern 3 executes the snoop tag modification patterns 1 and 2 in a good balance, it is possible to improve system performance, while maintaining a balance between reducing occurrences of useless Evictions and reducing the probability of the snoop tag continuously retaining the entry having already been changed from S (Shared) to I (Invalid) in the cache tag in the CPU.

FIGS. 7A, 7B, 8A and 8B illustrate examples of snoop tag modification in the first case. Hereinafter, by using FIGS. 7A, 7B, 8A and 8B, the examples of snoop tag modification will be described in the case where the address requested to be read has been registered in S (Shared) in the snoop tag 111b corresponding to the CPU 120b connected to the same CPU bus 130a to which the CPU 120a having issued the read request is connected. FIGS. 7A, 7B, 8A and 8B show examples of modifying one same index in the cache tag 122a, the cache tag 122b, the snoop tag 111a and the snoop tag 111b in the configuration shown in FIG. 1.

FIG. 7A illustrates an example of conventional snoop tag modification. In FIG. 7A, phase 0 shows statuses of the respective tags at a certain point. All states of the respective entries are S (Shared).

Here, it is assumed that the CPU 120a hopes to read the block number 5000. Since the cache tag 122a is in a way-full state, the CPU 120a drops the block number 1000 into I (Invalid), in other word, changes the state of the block number 1000 to I (Invalid), and issues the request to read the block number 5000. The respective tags become the statuses of phase 1.

Since the snoop tag 111a is in the way-full state, the system controller 110 performs Eviction with respect to the block number 2000 and registers the block number 5000. Due to Eviction by the system controller 110, the CPU 120a drops the block number 2000 in the cache tag 122a into I (Invalid), in other word, changes the state of the block number 2000 to I (Invalid). The respective tags become the statuses of phase 2.

In response to a reply of a read result, the CPU 120a registers the block number 5000 in the cache tag 122a. The respective tags become the statuses of phase 3.

FIG. 7B illustrates an example of snoop tag modification according to the snoop tag modification pattern 1 in the first case. In FIG. 7B, phase 0 shows the statuses of the respective tags at a certain point. All states of the respective entries are S (Shared).

Here, it is assumed that the CPU 120a hopes to read the block number 5000. Since the cache tag 122a is in the way-full state, the CPU 120a drops the block number 1000 into I (Invalid) and issues the request to read the block number 5000. The respective tags become the statuses of phase 1.

Since the block number 5000 has been registered in the snoop tag 111b corresponding to the cache tag 122b in the CPU 120b connected to the same CPU bus 130a to which the CPU 120a is connected, the system controller 110 does not modify the snoop tag 111a. The respective tags become the statuses of phase 2 (unchanged from the statuses of phase 1).

In response to the reply of the read result, the CPU 120a registers the block number 5000 in the cache tag 122a. The respective tags become the statuses of phase 3.

Figure 8A:
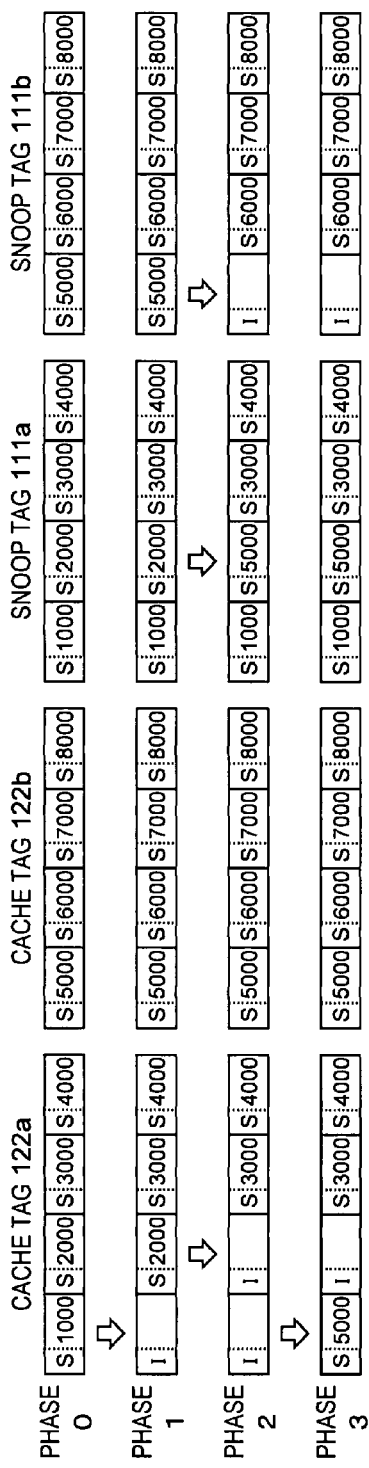

FIG. 8A illustrates an example of snoop tag modification according to the snoop tag modification pattern 2 of the first case. In FIG. 8A, phase 0 shows the statuses of the respective tags at a certain point. All states of the respective entries are S (Shared).

Here, it is assumed that the CPU 120a hopes to read the block number 5000. Since the cache tag 122a is in the way-full state, the CPU 120a drops the block number 1000 into I (Invalid) and issues the request to read the block number 5000. The respective tags become the statuses of phase 1.

Since the block number 5000 has been registered in the snoop tag 111b corresponding to the cache tag 122b in the CPU 120b connected to the same CPU bus 130a to which the CPU 120a is connected, the system controller 110 deletes the block number 5000 in the snoop tag 111b. Since the snoop tag 111a is in the way-full state, the system controller 110 performs Eviction with respect to the block number 2000 and registers the block number 5000. Due to Eviction by the system controller 110, the CPU 120a drops the block number 2000 in the cache tag 122a into I (Invalid). The respective tags become the statuses of phase 2.

In response to the reply of the read result, the CPU 120a registers the block number 5000 in the cache tag 122a. The respective tags become the statuses of phase 3.

Figure 8B:
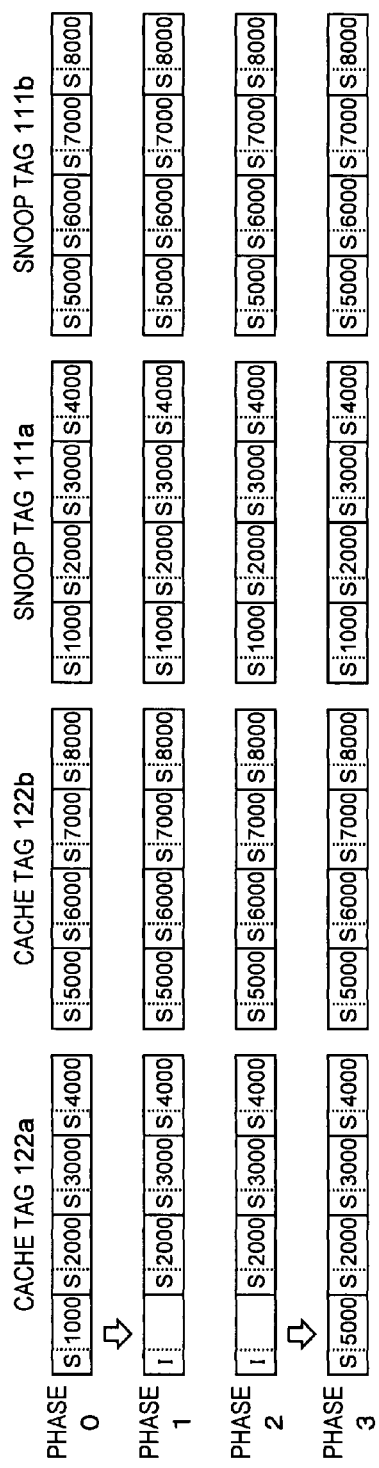

FIG. 8B illustrates an example of snoop tag modification according to the snoop tag modification pattern 3 of the first case. In FIG. 8B, phase 0 shows the statuses of the respective tags at a certain point. All states of the respective entries are S (Shared).

Here, it is assumed that the CPU 120a hopes to read the block number 5000. Since the cache tag 122a is in the way-full state, the CPU 120a I-drops the block number 1000 and issues the request to read the block number 5000. The respective tags become the statuses of phase 1.

The system controller 110 compares the numbers of used entries in the snoop tag 111a and the snoop tag 111b respectively corresponding to the CPU 120a and the CPU 120b connected to the same CPU bus 130a. Here, since the snoop tag 111b has a fewer number of used entries except the block number 5000, the snoop tag 111a and the snoop tag 111b are not particularly modified. The respective tags become the statuses of phase 2 (unchanged from the statuses of phase 1).

In response to the reply of the read result, the CPU 120a registers the block number 5000 in the cache tag 122a. The respective tags become the statuses of phase 3.

FIGS. 9A, 9B, 10A and 10B illustrate examples of snoop tag modification in a second case. Hereinafter, by using FIGS. 9A, 9B, 10A and 10B, the examples of snoop tag modification will be described in the case where the address requested to be read has been registered in S (Shared) in the snoop tag 111b corresponding to the CPU 120b connected to the same CPU bus 130a to which the CPU 120a having issued the read request is connected. FIGS. 9A, 9B, 10A and 10B show examples of modifying one same index in the cache tag 122a, the cache tag 122b, the snoop tag 111a and the snoop tag 111b in the configuration shown in FIG. 1.

FIG. 9A illustrates an example of conventional snoop tag modification in the second case. In FIG. 9A, phase 0 shows the statuses of the respective tags at a certain point. All states of the respective entries are S (Shared).

Here, it is assumed that the CPU 120a hopes to read the block number 5000. Since the cache tag 122a is not in the way-full state, the CPU 120a issues the request to read the block number 5000 without dropping. The respective tags become the statuses of phase 1 (unchanged from the statuses of phase 0).

The system controller 110 registers the block number 5000 in the blank entry in the snoop tag 111a. The respective tags become the statuses of phase 2.

In response to the reply of the read result, the CPU 120a registers the block number 5000 in the cache tag 122a. The respective tags become the statuses of phase 3.

FIG. 9B illustrates an example of snoop tag modification according to the snoop tag modification pattern 1 in the second case. In FIG. 9B, phase 0 shows the statuses of the respective tags at a certain point. All states of the respective entries are S (Shared).

Here, it is assumed that the CPU 120a hopes to read the block number 5000. Since the cache tag 122a is not in the way-full state, the CPU 120a issues the request to read the block number 5000 without dropping. The respective tags become the statuses of phase 1 (unchanged from the statuses of phase 0).

Since the block number 5000 has been registered in the snoop tag 111b corresponding to the cache tag 122b in the CPU 120b connected to the same CPU bus 130a to which the CPU 120a is connected, the system controller 110 does not modify the snoop tag 111a. The respective tags become the statuses of phase 2 (unchanged from the statuses of phase 1).

In response to the reply of the read result, the CPU 120a registers the block number 5000 in the cache tag 122a. The respective tags become the statuses of phase 3.

Figure 10A:
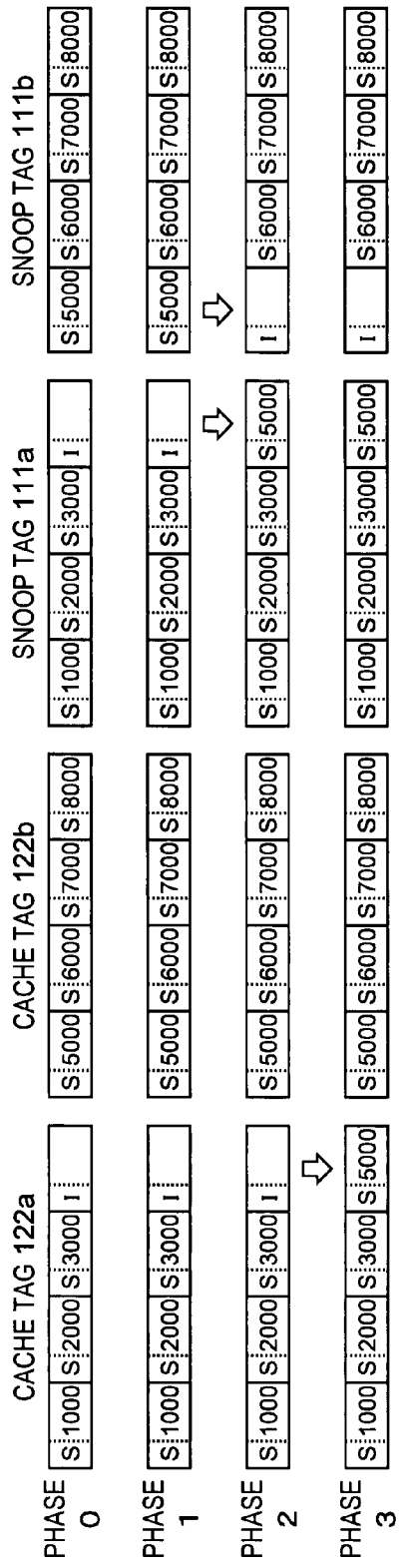

FIG. 10A illustrates an example of snoop tag modification according to the snoop tag modification pattern 2 in the second case. In FIG. 10A, phase 0 shows the statuses of the respective tags at a certain point. All states of the respective entries are S (Shared).

Here, it is assumed that the CPU 120a hopes to read the block number 5000. Since the cache tag 122a is not in the way-full state, the CPU 120a issues the request to read the block number 5000 without dropping, that is to say, changing the states. The respective tags become the statuses of phase 1 (unchanged from the statuses of phase 0).

Since the block number 5000 has been registered in the snoop tag 111b corresponding to the cache tag 122b in the CPU 120b connected to the same CPU bus 130a to which the CPU 120a is connected, the system controller 110 deletes the block number 5000 in the snoop tag 111b. The system controller 110 registers the block number 5000 in the blank entry in the snoop tag 111a. The respective tags become the statuses of phase 2.

In response to the reply of the read result, the CPU 120a registers the block number 5000 in the cache tag 122a. The respective tags become the statuses of phase 3.

Figure 10B:
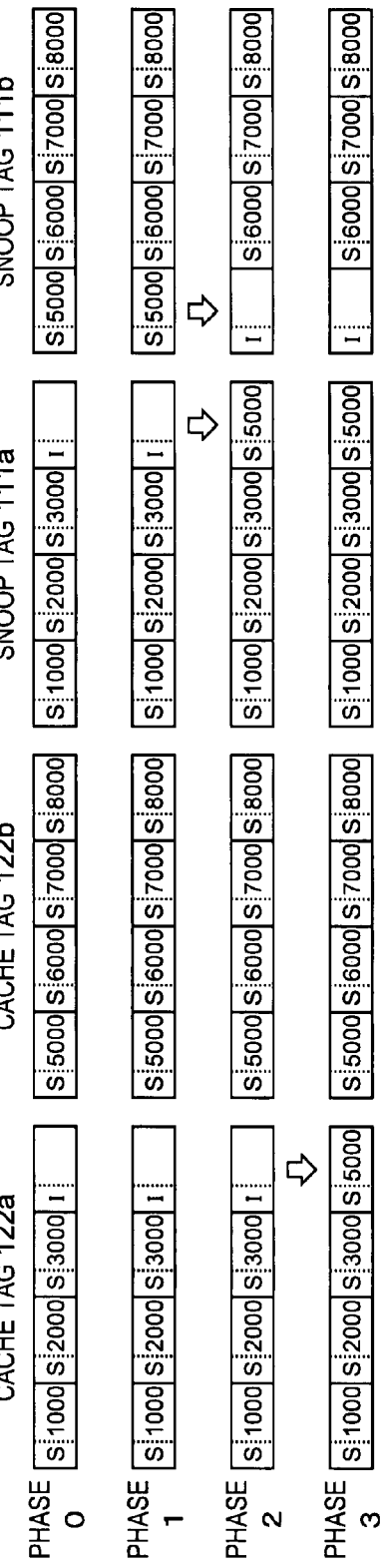

FIG. 10B illustrates an example of snoop tag modification according to the snoop tag modification pattern 3 in the second case. In FIG. 10B, phase 0 shows the statuses of the respective tags at a certain point. All states of the respective entries are S (Shared).

Here, it is assumed that the CPU 120a hopes to read the block number 5000. Since the cache tag 122a is not in the way-full state, the CPU 120a issues the request to read the block number 5000 without dropping. The respective tags become the statuses of phase 1 (unchanged from the statuses of phase 0).

The system controller 110 compares the numbers of used entries in the snoop tag 111a and the snoop tag 111b respectively corresponding to the CPU 120a and the CPU 120b connected to the same CPU bus 130a. Here, since the both numbers of used entries except the block number 5000 are same, the system controller 110 deletes the block number 5000 registered in the snoop tag 111b. The system controller 110 registers the block number 5000 in the blank entry in the snoop tag 111a. The respective tags become the statuses of phase 2.

In response to the reply of the read result, the CPU 120a registers the block number 5000 in the cache tag 122a. The respective tags become the statuses of phase 3.

Hereinabove, the examples of snoop tag modification have been described in the case where the address requested to be read has been registered in S (Shared) in the snoop tag 111b corresponding to the other CPU 120b connected to the same CPU bus 130a to which the CPU 120a having issued the read request is connected. Next, the examples of snoop tag modification will be described in the case where the address requested to be read has been registered in E (Exclusive) in the snoop tag 111b corresponding to the CPU 120b connected to the same CPU bus 130a to which the CPU 120a having issued the read request is connected. If the address requested to be read has been registered in E (Exclusive), that E (Exclusive) is changed to S (Shared), and the above described snoop tag modification is performed.

Figure 11:
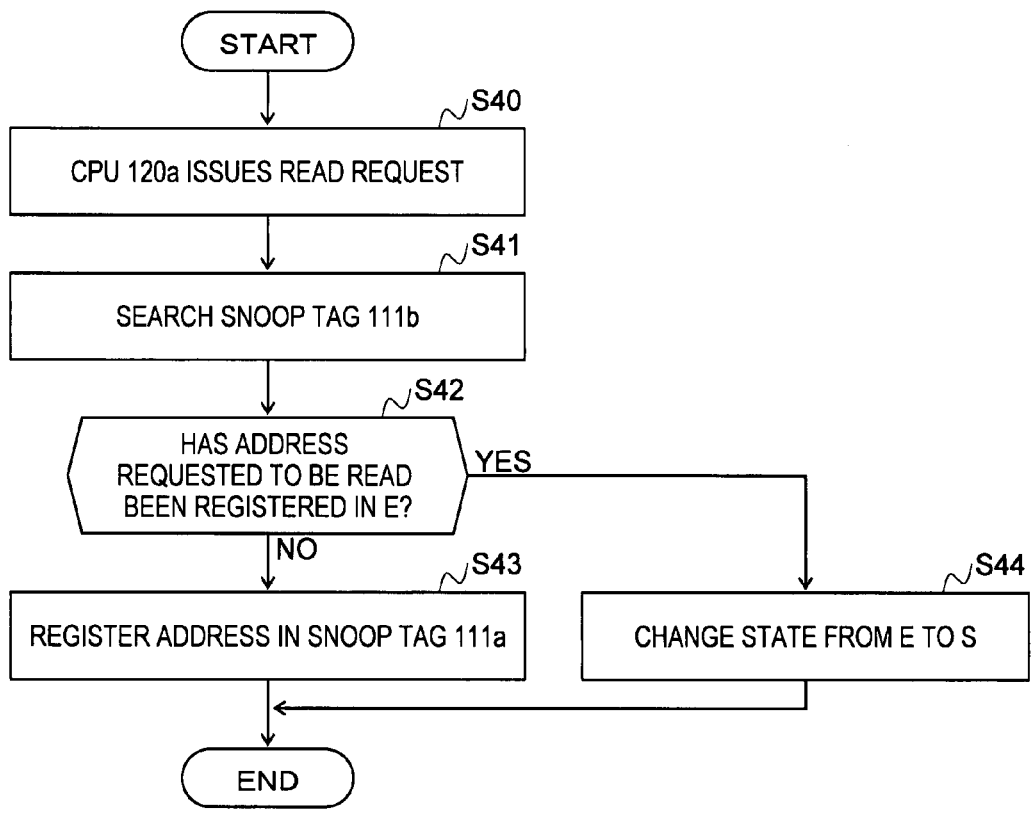
FIG. 11 is a snoop tag modification process flowchart according to the snoop tag modification pattern 1 in a second case.

FIG. 11 is a snoop tag modification process flowchart according to the snoop tag modification pattern 1 in the second case. In FIG. 11, the snoop tag modification according to the above described snoop tag modification pattern 1 is performed, considering the case where the address requested to be read has been registered in E (Exclusive) in the snoop tag 111b corresponding to the other CPU 120b connected to the same CPU bus 130a to which the CPU 120a having issued the read request is connected.

The CPU 120a issues the read request (step S40). The snoop tag 111b corresponding to the other CPU 120b connected to the same CPU bus 130a to which the CPU 120a having issued the read request is connected is searched (step S41). As a result of the search, if the address requested to be read has not been registered in E (Exclusive) (step S42), the address requested to be read is registered in the snoop tag 111a corresponding to the CPU 120a having issued the read request (step S43).

As a result of the search, if the address requested to be read has been registered in E (Exclusive) (step S42), the state of the address requested to be read in the snoop tag 111b is changed from E (Exclusive) to S (Shared) (step S44). The snoop tag 111a corresponding to the CPU 120a having issued the read request is not modified.

Figure 12:
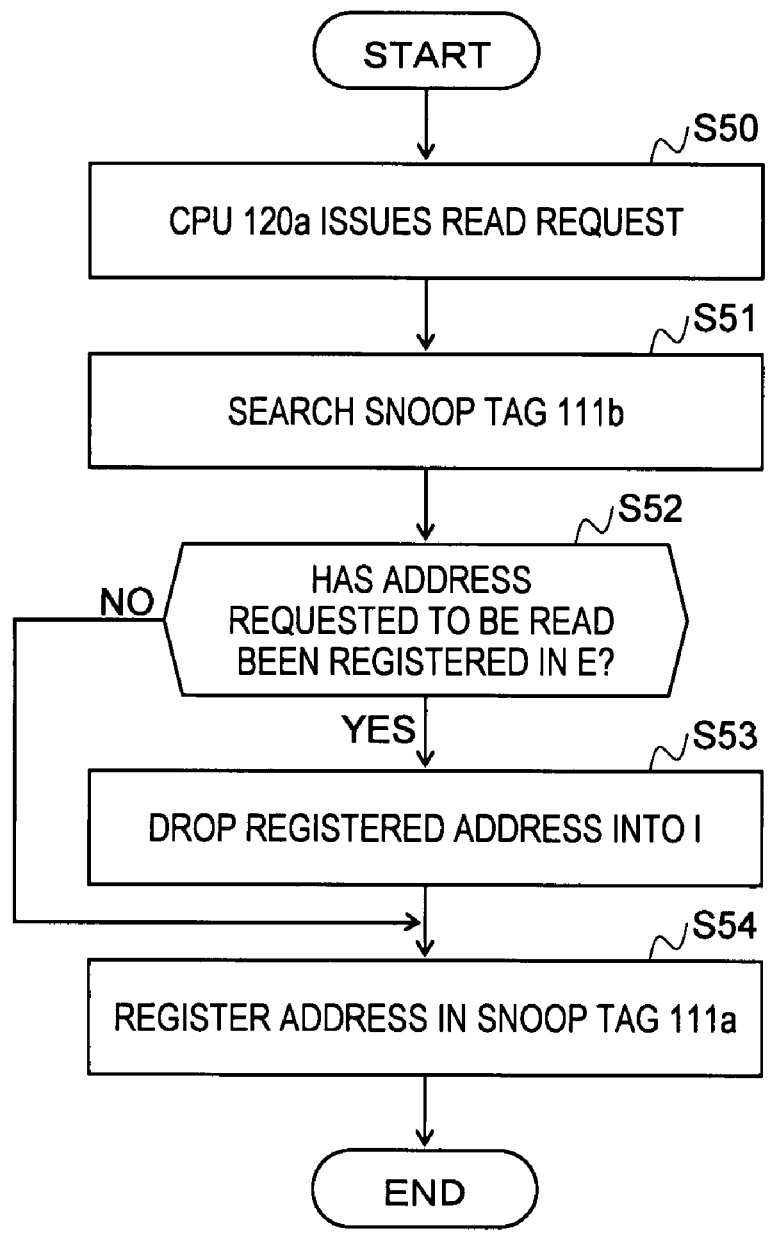
FIG. 12 is a snoop tag modification process flowchart according to the snoop tag modification pattern 2 in the second case.

FIG. 12 is a snoop tag modification process flowchart according to the snoop tag modification pattern 2 in the second case. In FIG. 12, the snoop tag modification according to the above described snoop tag modification pattern 2 is performed, considering the case where the address requested to be read has been registered in E (Exclusive) in the snoop tag 111b corresponding to the other CPU 120b connected to the same CPU bus 130a to which the CPU 120a having issued the read request is connected.

The CPU 120a issues the read request (step S50). The snoop tag 111b corresponding to the other CPU 120b connected to the same CPU bus 130a to which the CPU 120a having issued the read request is connected is searched (step S51). As a result of the search, if the address requested to be read has not been registered in E (Exclusive) (step S52), the address requested to be read is registered in the snoop tag 111a corresponding to the CPU 120a having issued the read request (step S54).

As a result of the search, if the address requested to be read has been registered in E (Exclusive) (step S52), the address registered in the snoop tag 111b is dropped into I (Invalid) (step S53), and the address requested to be read is registered in the snoop tag 111a corresponding to the CPU 120a having issued the read request (step S54).

Figure 13:
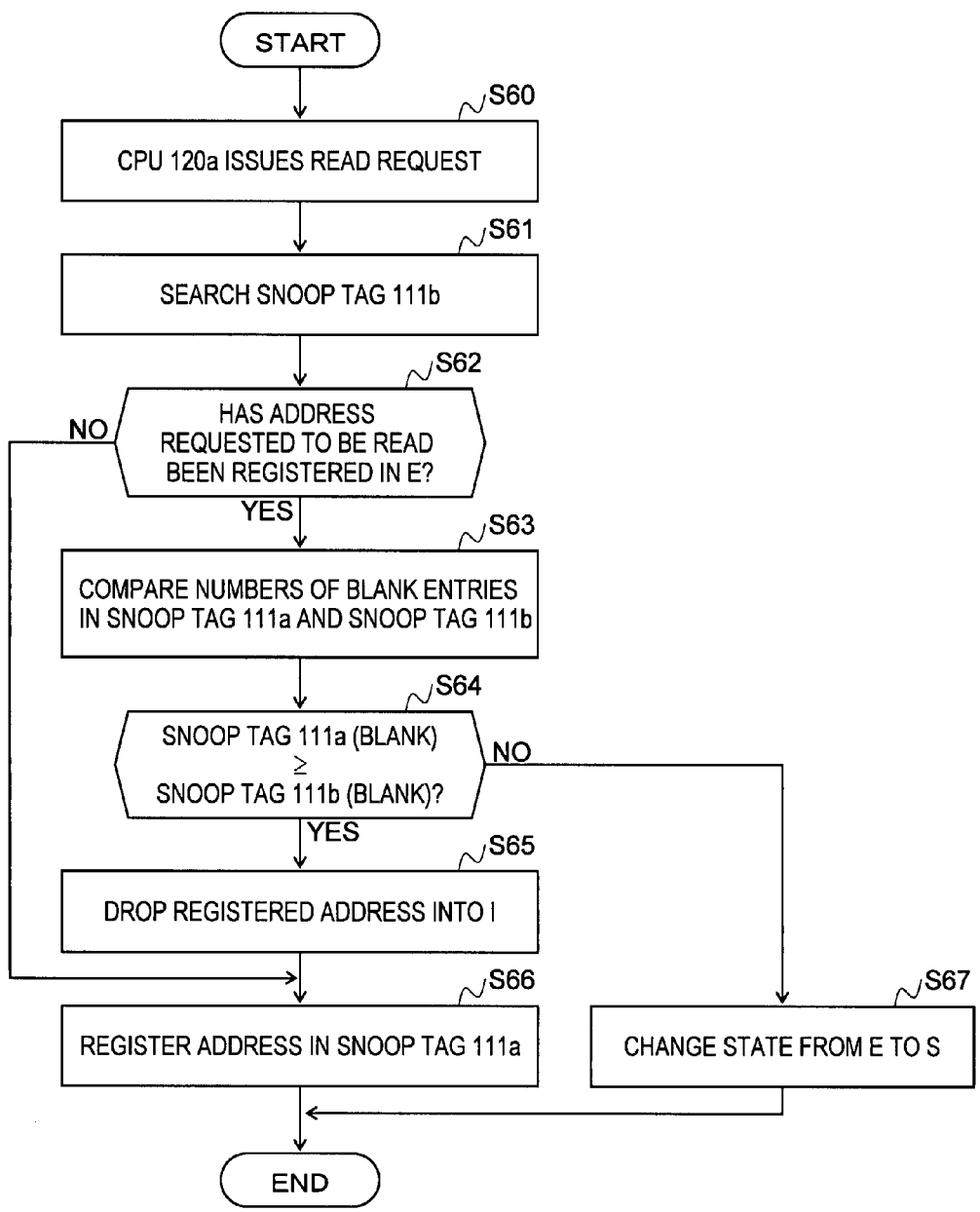
FIG. 13 is a snoop tag modification process flowchart according to the snoop tag modification pattern 3 in the second case.

FIG. 13 is a snoop tag modification process flowchart according to the snoop tag modification pattern 3 in the second case. In FIG. 13, the snoop tag modification according to the above described snoop tag modification pattern 3 is performed, considering the case where the address requested to be read has been registered in E (Exclusive) in the snoop tag 111b corresponding to the other CPU 120b connected to the same CPU bus 130a to which the CPU 120a having issued the read request is connected.

The CPU 120a issues the read request (step S60). The snoop tag 111b corresponding to the other CPU 120b connected to the same CPU bus 130a to which the CPU 120a having issued the read request is connected is searched (step S61). As a result of the search, if the address requested to be read has not been registered in E (Exclusive) (step S62), the address requested to be read is registered in the snoop tag 111a corresponding to the CPU 120a having issued the read request (step S66).

As a result of the search, if the address requested to be read has been registered in E (Exclusive) (step S62), the number of blank entries in the snoop tag 111a corresponding to the CPU 120a having issued the read request and the number of blank entries in the snoop tag 111b are compared (step S63). Here, it should be noted that the entry in which the address requested to be read has been registered in the snoop tag 111b is regarded as the blank entry.

If the number of blank entries in the snoop tag 111a is larger than or equal to the number of blank entries in the snoop tag 111b (step S64), the address registered in the snoop tag 111b is dropped into I (Invalid) (step S65). The address requested to be read is registered in the snoop tag 111a corresponding to the CPU 120a having issued the read request (step S66).

If the number of blank entries in the snoop tag 111a is less than the number of blank entries in the snoop tag 111b (step S64), the state of the address requested to be read in the snoop tag 111b is changed from E (Exclusive) to S (Shared) (step S67). The snoop tag 111a corresponding to the CPU 120a having issued the read request is not modified.

FIGS. 14A, 14B, 15A and 15B illustrate examples of snoop tag modification in a third case. Hereinafter, by using FIGS. 14A, 14B, 15A and 15B, the examples of snoop tag modification will be described in the case where the address requested to be read has been registered in E (Exclusive) in the snoop tag 111b corresponding to the CPU 120b connected to the same CPU bus 130a to which the CPU 120a having issued the read request is connected. FIGS. 14A, 14B, 15A and 15B show examples of modifying one same index in the cache tag 122a, the cache tag 122b, the snoop tag 111a and the snoop tag 111b in the configuration shown in FIG. 1.

FIG. 14A illustrates an example of conventional snoop tag modification in the third case. In FIG. 14A, phase 0 shows the statuses of the respective tags at a certain point. The states of the block number 5000 in the cache tag 122b and the snoop tag 111b are E (Exclusive), and the states of other entries are S (Shared).

Here, it is assumed that the CPU 120a hopes to read the block number 5000. Since the cache tag 122a is in the way-full state, the CPU 120a drops the block number 1000 into I (Invalid), that is to say, changes the state of the block number 1000 to I (Invalid), then issues the request to read the block number 5000. At this point, the CPU 120b of the same CPU bus 130a changes the state of the block number 5000 in the cache tag 122b from E (Exclusive) to S (Shared). The respective tags become the statuses of phase 1.

Since the snoop tag 111a is in the way-full state, the system controller 110 performs Eviction with respect to the block number 2000 and registers the block number 5000. At this point, the state of the block number 5000 in the snoop tag 111b is changed from E (Exclusive) to S (Shared). Due to Eviction by the system controller 110, the CPU 120a drops the block number 2000 in the cache tag 122a into I (Invalid), that is, changes the state of the block number 2000 to I (Invalid). The respective tags become the statuses of phase 2.

In response to the reply of the read result, the CPU 120a registers the block number 5000 in the cache tag 122a. The respective tags become the statuses of phase 3.

FIG. 14B illustrates an example of snoop tag modification according to the snoop tag modification pattern 1 in the third case. In FIG. 14B, phase 0 shows the statuses of the respective tags at a certain point. The states of the block number 5000 in the cache tag 122b and the snoop tag 111b are E (Exclusive), and the states of other entries are S (Shared).

Here, it is assumed that the CPU 120a hopes to read the block number 5000. Since the cache tag 122a is in the way-full state, the CPU 120a I-drops the block number 1000, and issues the request to read the block number 5000. At this point, the CPU 120b of the same CPU bus 130a changes the state of the block number 5000 in the cache tag 122b from E (Exclusive) to S (Shared). The respective tags become the statuses of phase 1.

Since the block number 5000 has been registered in E (Exclusive) in the snoop tag 111b corresponding to the cache tag 122b in the CPU 120b connected to the same CPU bus 130a to which the CPU 120a is connected, the system controller 110 drops the state of the block number 5000 in the snoop tag 111b from E (Exclusive) to S (Shared). The system controller 110 does not modify the snoop tag 111a. The respective tags become the statuses of phase 2.

In response to the reply of the read result, the CPU 120a registers the block number 5000 in the cache tag 122a. The respective tags become the statuses of phase 3.

FIG. 15A illustrates an example of snoop tag modification according to the snoop tag modification pattern 2 in the third case. In FIG. 15A, phase 0 shows the statuses of the respective tags at a certain point. The states of the block number 5000 in the cache tag 122b and the snoop tag 111b are E (Exclusive), and the states of other entries are S (Shared).

Here, it is assumed that the CPU 120a hopes to read the block number 5000. Since the cache tag 122a is in the way-full state, the CPU 120a drops the block number 1000 into I (Invalid), that is, changes the state of the block number 1000 to I (Invalid), and issues the request to read the block number 5000. At this point, the CPU 120b of the same CPU bus 130a changes the state of the block number 5000 in the cache tag 122b from E (Exclusive) to S (Shared). The respective tags become the statuses of phase 1.

Since the block number 5000 has been registered in the snoop tag 111b corresponding to the cache tag 122b in the CPU 120*b* connected to the same CPU bus 130*a* to which the CPU 120*a* is connected, the system controller 110 deletes the block number 5000 in the snoop tag 111*b*. Since the snoop tag 111*a* is in the way-full state, the system controller 110 performs Eviction with respect to the block number 2000 and registers the block number 5000. Due to Eviction by the system controller 110, the CPU 120*a* drops the block number 2000 in the cache tag 122*a* into I (Invalid), that is, changes the state of the block number 2000 to I (Invalid). The respective tags become the statuses of phase 2.

In response to the reply of the read result, the CPU 120*a* registers the block number 5000 in the cache tag 122*a*. The respective tags become the statuses of phase 3.

FIG. 15B illustrates an example of snoop tag modification according to the snoop tag modification pattern 3 in the third case. In FIG. 15B, phase 0 shows the statuses of the respective tags at a certain point. The states of the block number 5000 in the cache tag 122*b* and the snoop tag 111*b* are E (Exclusive), and the states of other entries are S (Shared).

Here, it is assumed that the CPU 120*a* hopes to read the block number 5000. Since the cache tag 122*a* is in the way-full state, the CPU 120*a* drops the block number 1000 into I (Invalid), that is, changes the state of the block number 1000 to I (Invalid), then issues the request to read the block number 5000. At this point, the CPU 120*b* of the same CPU bus 130*a* changes the state of the block number 5000 in the cache tag 122*b* from E (Exclusive) to S (Shared). The respective tags become the statuses of phase 1.

The system controller 110 compares the numbers of used entries in the snoop tag 111*a* and the snoop tag 111*b* respectively corresponding to the CPU 120*a* and the CPU 120*b* connected to the same CPU bus 130*a*. Here, since the snoop tag 111*b* has a fewer number of used entries except the block number 5000, the snoop tag 111*a* is not particularly modified. The state of the block number 5000 in the snoop tag 111*b* is changed from E (Exclusive) to S (Shared). The respective tags become the statuses of phase 2.

In response to the reply of the read result, the CPU 120*a* registers the block number 5000 in the cache tag 122*a*. The respective tags become the statuses of phase 3.

FIGS. 16A, 16B, 17A and 17B illustrate examples of snoop tag modification in a fourth case. Hereinafter, by using FIGS. 16A, 16B, 17A and 17B, the examples of snoop tag modification will be described in the case where the address requested to be read has been registered in E (Exclusive) in the snoop tag 111*b* corresponding to the CPU 120*b* connected to the same CPU bus 130*a* to which the CPU 120*a* having issued the read request is connected. FIGS. 16A, 16B, 17A and 17B show examples of modifying one same index in the cache tag 122*a*, the cache tag 122*b*, the snoop tag 111*a* and the snoop tag 111*b* in the configuration shown in FIG. 1.

FIG. 16A illustrates an example of conventional snoop tag modification in the fourth case. In FIG. 16A, phase 0 shows the statuses of the respective tags at a certain point. The states of the block number 5000 in the cache tag 122*b* and the snoop tag 111*b* are E (Exclusive), and the states of other entries are S (Shared).

Here, it is assumed that the CPU 120*a* hopes to read the block number 5000. Since the cache tag 122*a* is not in the way-full state, the CPU 120*a* issues the request to read the block number 5000 without dropping, that is, changing the states. At this point, the CPU 120*b* of the same CPU bus 130*a* changes the state of the block number 5000 in the cache tag 122*b* from E (Exclusive) to S (Shared). The respective tags become the statuses of phase 1.

The system controller 110 registers the block number 5000 in the blank entry in the snoop tag 111*a*. At this point, the state of the block number 5000 in the snoop tag 111*b* is changed from E (Exclusive) to S (Shared). The respective tags become the statuses of phase 2.

In response to the reply of the read result, the CPU 120*a* registers the block number 5000 in the cache tag 122*a*. The respective tags become the statuses of phase 3.

FIG. 16B illustrates an example of snoop tag modification according to the snoop tag modification pattern 1 in the fourth case. In FIG. 16B, phase 0 shows the statuses of the respective tags at a certain point. The states of the block number 5000 in the cache tag 122*b* and the snoop tag 111*b* are E (Exclusive), and the states of other entries are S (Shared).

Here, it is assumed that the CPU 120*a* hopes to read the block number 5000. Since the cache tag 122*a* is not in the way-full state, the CPU 120*a* issues the request to read the block number 5000 without dropping, that is, changing the states. At this point, the CPU 120*b* of the same CPU bus 130*a* changes the state of the block number 5000 in the cache tag 122*b* from E (Exclusive) to S (Shared). The respective tags become the statuses of phase 1.

Since the block number 5000 has been registered in E (Exclusive) in the snoop tag 111*b* corresponding to the cache tag 122*b* in the CPU 120*b* connected to the same CPU bus 130*a* to which the CPU 120*a* is connected, the system controller 110 changes the state of the block number 5000 in the snoop tag 111*b* from E (Exclusive) to S (Shared). The system controller 110 does not modify the snoop tag 111*a*. The respective tags become the statuses of phase 2.

In response to the reply of the read result, the CPU 120*a* registers the block number 5000 in the cache tag 122*a*. The respective tags become the statuses of phase 3.

Figure 17A:
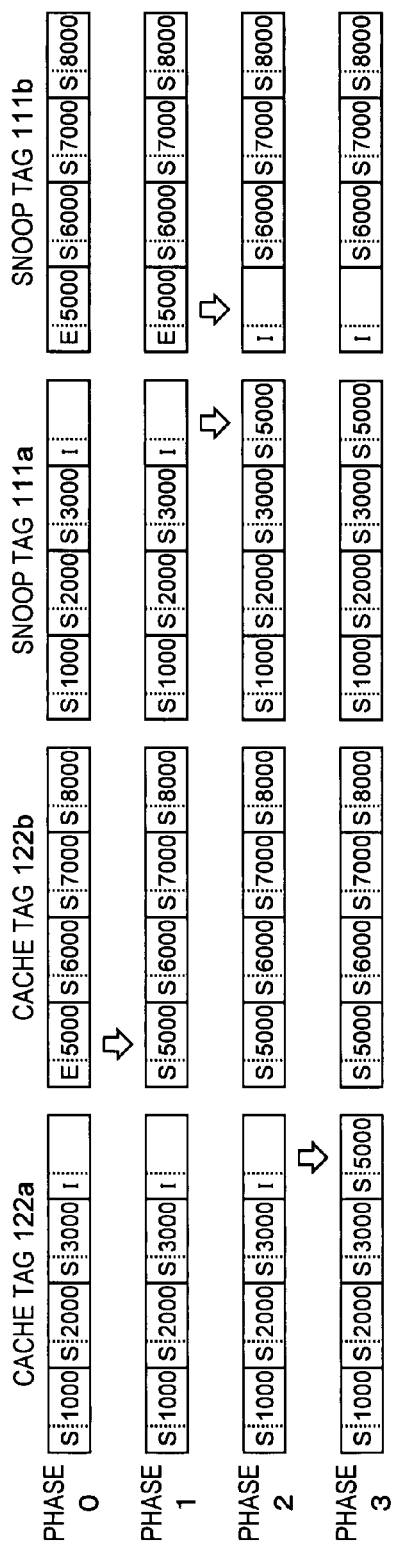

FIG. 17A illustrates an example of snoop tag modification according to the snoop tag modification pattern 2 in the fourth case. In FIG. 17A, phase 0 shows the statuses of the respective tags at a certain point. The states of the block number 5000 in the cache tag 122*b* and the snoop tag 111*b* are E (Exclusive), and the states of other entries are S (Shared).

Here, it is assumed that the CPU 120*a* hopes to read the block number 5000. Since the cache tag 122*a* is not in the way-full state, the CPU 120*a* issues the request to read the block number 5000 without dropping, that is, changing the states. At this point, the CPU 120*b* of the same CPU bus 130*a* changes the state of the block number 5000 in the cache tag 122*b* from E (Exclusive) to S (Shared). The respective tags become the statuses of phase 1.

Since the block number 5000 has been registered in the snoop tag 111*b* corresponding to the cache tag 122*b* in the CPU 120*b* connected to the same CPU bus 130*a* to which the CPU 120*a* is connected, the system controller 110 deletes the block number 5000 in the snoop tag 111*b*. The system controller 110 registers the block number 5000 in the blank entry in the snoop tag 111*a*. The respective tags become the statuses of phase 2.

In response to the reply of the read result, the CPU 120*a* registers the block number 5000 in the cache tag 122*a*. The respective tags become the statuses of phase 3.

Figure 17B:
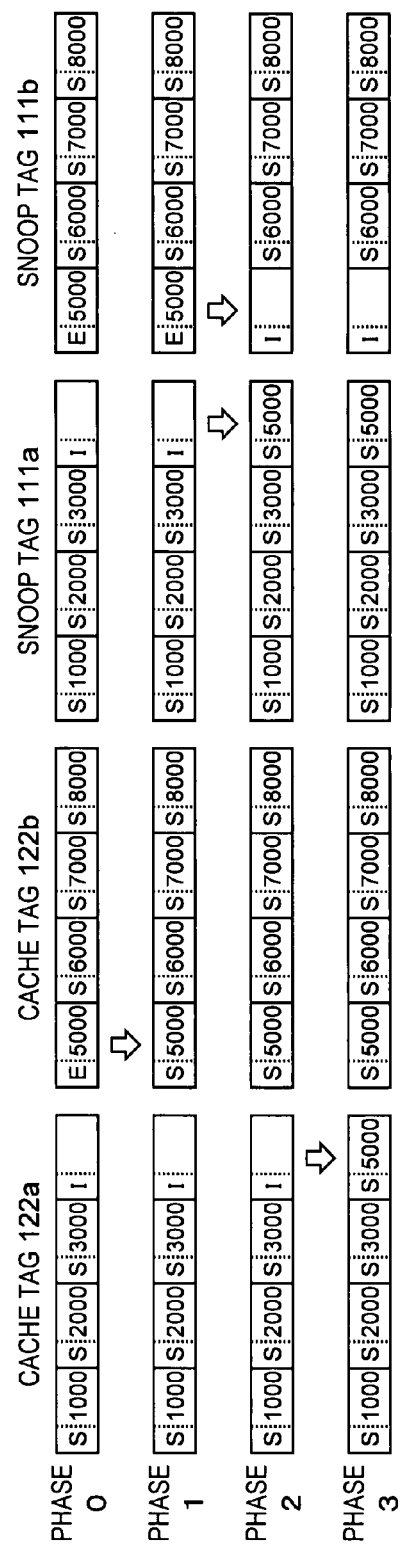

FIG. 17B illustrates an example of snoop tag modification according to the snoop tag modification pattern 3 in the fourth case. In FIG. 17B, phase 0 shows the statuses of the respective tags at a certain point. The states of the block number 5000 in the cache tag 122*b* and the snoop tag 111*b* are E (Exclusive), and the states of other entries are S (Shared).

Here, it is assumed that the CPU 120*a* hopes to read the block number 5000. Since the cache tag 122*a* is not in the way-full state, the CPU 120*a* issues the request to read the block number 5000 without dropping, that is, changing the states. At this point, the CPU 120*b* of the same CPU bus 130*a* changes the state of the block number 5000 in the cache tag 122*b* from E (Exclusive) to S (Shared). The respective tags become the statuses of phase 1.

The system controller 110 compares the numbers of used entries in the snoop tag 111*a* and the snoop tag 111*b* respectively corresponding to the CPU 120*a* and the CPU 120*b* connected to the same CPU bus 130*a*. Here, since the both numbers of used entries except the block number 5000 are same, the system controller 110 deletes the block number 5000 registered in the snoop tag 111*b*. The system controller 110 registers the block number 5000 in the blank entry in the snoop tag 111*a*. The respective tags become the statuses of phase 2.

In response to the reply of the read result, the CPU 120*a* registers the block number 5000 in the cache tag 122*a*. The respective tags become the statuses of phase 3.

The various snoop tag modification patterns as described hereinabove may be able to be changed with the mode signal.

Figure 18:
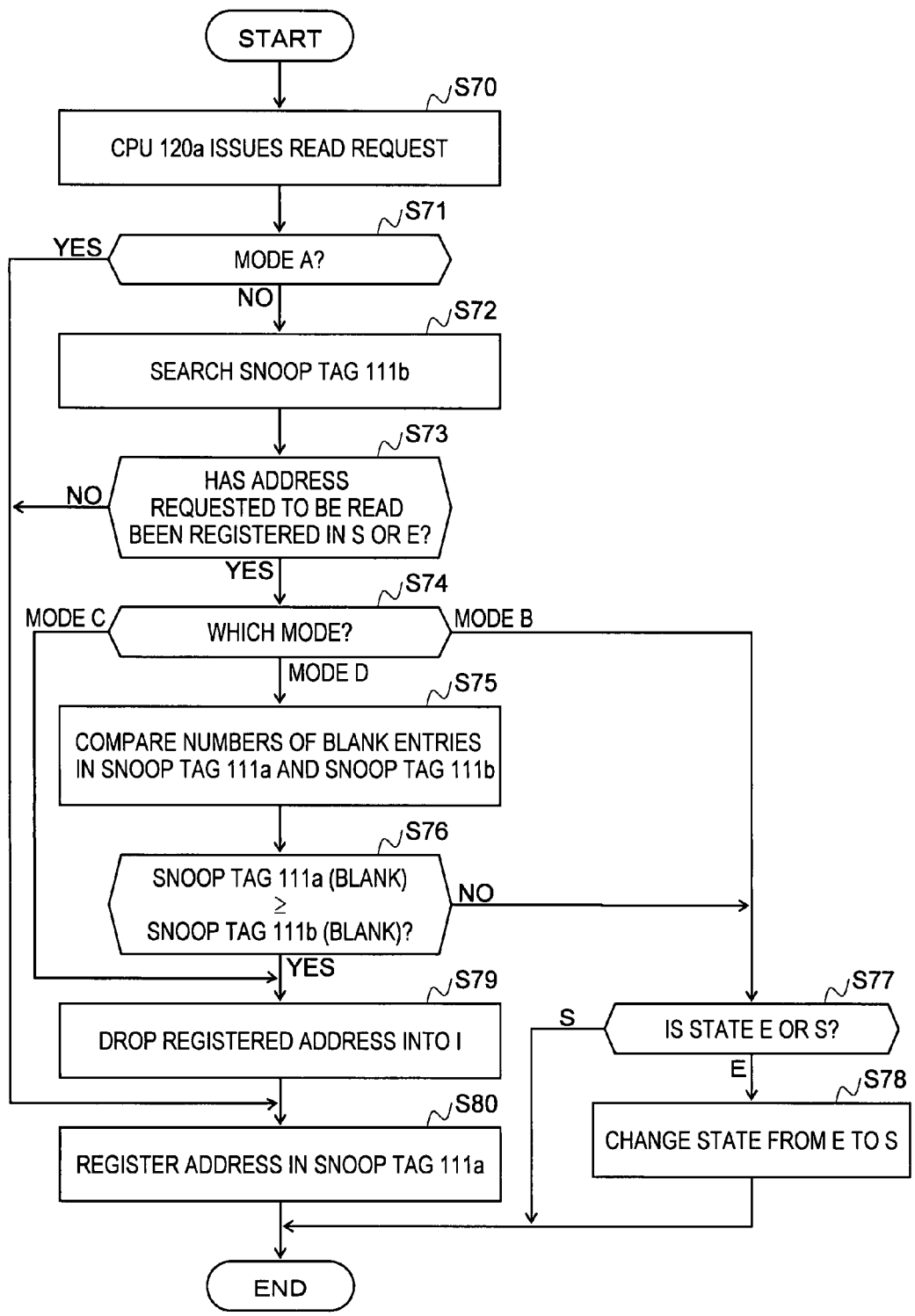
FIG. 18 is a snoop tag modification process flowchart in the case where a snoop tag modification mode can be changed.

FIG. 18 is a snoop tag modification process flowchart in the case where a snoop tag modification mode can be changed. Here, mode A, B, C and D denote the conventional snoop tag modification, the snoop tag modification pattern 1, the snoop tag modification pattern 2 and the snoop tag modification pattern 3, respectively.

The CPU 120*a* issues the read request (step S70). If a mode of the snoop tag modification is A (step S71), the address requested to be read is registered in the snoop tag 111*a* corresponding to the CPU 120*a* having issued the read request (step S80).

If the mode of the snoop tag modification is not A, the snoop tag 111*b* corresponding to the other CPU 120*b* connected to the same CPU bus 130*a* to which the CPU 120*a* having issued the read request is connected is searched (step S72). As a result of the search, if the address requested to be read has not been registered in S (Shared) or E (Exclusive) in the snoop tag 111*b* (step S73), the address requested to be read is registered in the snoop tag 111*a* corresponding to the CPU 120*a* having issued the read request (step S80).

If the address requested to be read has been registered in S (Shared) or E (Exclusive) in the snoop tag 111*b* (step S73), it is checked whether a mode of the snoop tag modification is B, C or D (step S74).

If the mode of the snoop tag modification is B, it is checked whether the state of the address requested to be read in the snoop tag 111*b* is S (Shared) or E (Exclusive) (step S77). If the state of the address is E (Exclusive), the state of the address requested to be read in the snoop tag 111*b* is changed from E (Exclusive) to S (Shared) (step S78). If the state of the address is S (Shared), the snoop tag 111 is not modified.

If the mode of the snoop tag modification is C, the state of the address requested to be read in the snoop tag 111*b* is changed from S (Shared) or E (Exclusive) to I (Invalid) (step S79), and the address requested to be read is registered in the snoop tag 111*a* corresponding to the CPU 120*a* having issued the read request (step S80).

If the mode of the snoop tag modification is D, the number of blank entries in the snoop tag 111*a* corresponding to the CPU 120*a* having issued the read request and the number of blank entries in the snoop tag 111*b* are compared (step S75). Here, it should be noted that the entry in which the address requested to be read has been registered in the snoop tag 111*b* is regarded as the blank entry.

If the number of blank entries in the snoop tag 111*a* is larger than or equal to the number of blank entries in the snoop tag 111*b* (step S76), the state of the address requested to be read in the snoop tag 111*b* is changed from S (Shared) or E (Exclusive) to I (Invalid) (step S79), and the address requested to be read is registered in the snoop tag 111*a* corresponding to the CPU 120*a* having issued the read request (step S80).

If the number of blank entries in the snoop tag 111*a* is less than the number of blank entries in the snoop tag 111*b* (step S76), it is checked whether the state of the address requested to be read in the snoop tag 111*b* is S (Shared) or E (Exclusive) (step S77). If the state of the address is E (Exclusive), the state of the address requested to be read in the snoop tag 111*b* is changed from E (Exclusive) to S (Shared) (step S78). If the state of the address is S (Shared), the snoop tag 111 is not modified.

Since the snoop tag modification process can be changed with the mode signal, a logic of the snoop tag modification process can be freely changed, which enables a real machine to study performance variation depending on a difference in snoop tag modification methods. In addition, from the result, the operation with an appropriate mode setting becomes possible.

Next, a cache replacement request addressing process by the cache replacement request addressing section 119 will be described. As shown in FIG. 2, in this embodiment, the snoop tag 111*a* and the snoop tag 111*b* respectively corresponding to the CPU 120*a* and the CPU 120*b* connected to the same CPU bus 130*a* are shared between the CPU 120*a* and the CPU 120*b* connected to the same CPU bus 130*a*. However, in this state, when the cache replacement request is issued, a problem may occur, because, for example, when an entry in registered in S (Shared) is dropped into I (Invalid) simply due to the cache replacement request, if the cache tag 122 of the other CPU connected to the same CPU bus 130*a* retains the same address registered in S (Shared), no S (Shared) registration information on the address will remain in the snoop tag 111. Hereinafter a process of addressing the problems which may be caused by issuing the cache replacement request will be described.

Figure 19A:
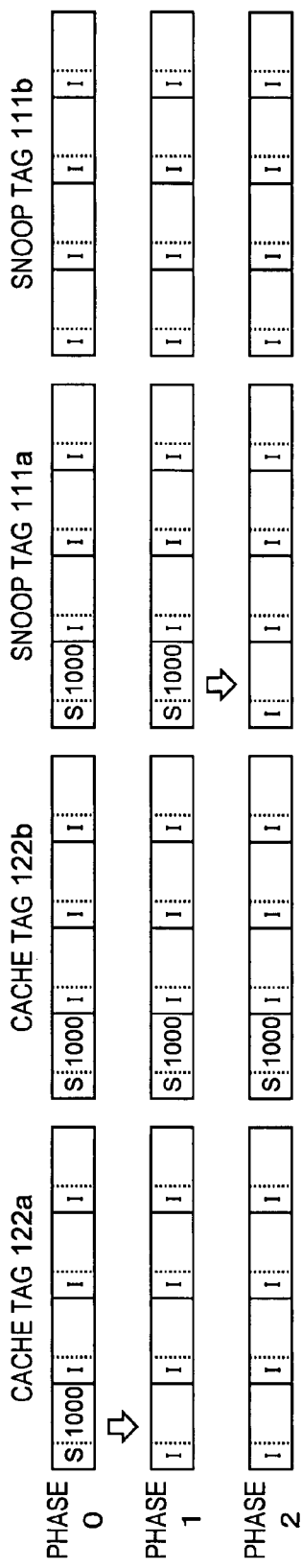
FIGS. 19A and 19B illustrate examples of a process of invalidating a cache replacement request.
Figure 19B:
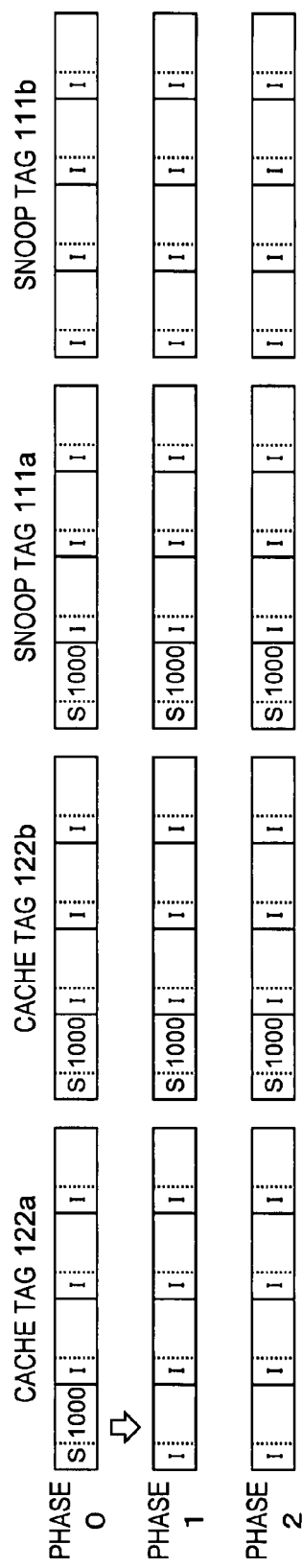

FIGS. 19A and 19B illustrate examples of a process of invalidating the cache replacement request. Hereinafter, by using FIGS. 19A and 19B, the examples of the process will be described in the case where the CPU 120*a* has issued the cache replacement request. FIGS. 19A and 19B show examples of one same index in the cache tag 122*a*, the cache tag 122*b*, the snoop tag 111*a* and the snoop tag 111*b* in the configuration shown in FIG. 1.

FIG. 19A illustrates the example in the case where the process of invalidating the cache replacement request is not performed. In FIG. 19A, phase 0 shows the statuses of the respective tags at a certain point. Here, the CPU 120*a* issues the cache replacement request for the block number 1000, and deletes the block number 1000 from the cache tag 122*a*. The respective tags become the statuses of phase 1.

The system controller 110 receives the cache replacement request from the CPU 120*a*, and deletes the block number 1000 from the snoop tag 111*a*. The respective tags become the statuses of phase 2.

However, in the statuses of phase 2, the block number 1000 has been registered in the cache tag 122*b* in the CPU 120*b* connected to the same CPU bus 130*a* to which the CPU 120*a* having issued the cache replacement request is connected, whereas the block number 1000 has not been registered in any of the snoop tag 111*a* and the snoop tag 111*b* in the system controller 110, which causes a coherency error.

FIG. 19B illustrates the example in the case where the process of invalidating the cache replacement request is performed in this embodiment. In FIG. 19B, phase 0 shows the statuses of the respective tags at a certain point. Here, the CPU 120*a* issues the cache replacement request for the block number 1000, and deletes the block number 1000 from the cache tag 122a. At this point, the cache replacement request addressing section 119 in the request handling section 114 of the system controller 110 snoops within the CPU bus 130a, and detects from the cache tag 122b that the CPU 120b has registered the block number 1000 in S (Shared). The respective tags become the statuses of phase 1.

From a result of the snoop that the CPU 120b has registered the block number 1000 in S (Shared), the system controller 110 invalidates the cache replacement request from the CPU 120a. In other words, the block number 1000 in the snoop tag 111a is not deleted. The respective tags become the statuses of phase 2.

In this way, when the CPU 120a has issued the cache replacement request, the inside of the CPU bus 130a to which the CPU 120a having issued the cache replacement request is connected is snooped, and if there is the cache tag 122b in which the address requested for the cache replacement has been registered, in the CPU bus 130a, the system controller 110 performs the process of invalidating the cache replacement request. Thereby it is possible to prevent the coherency error.

Figure 20A:
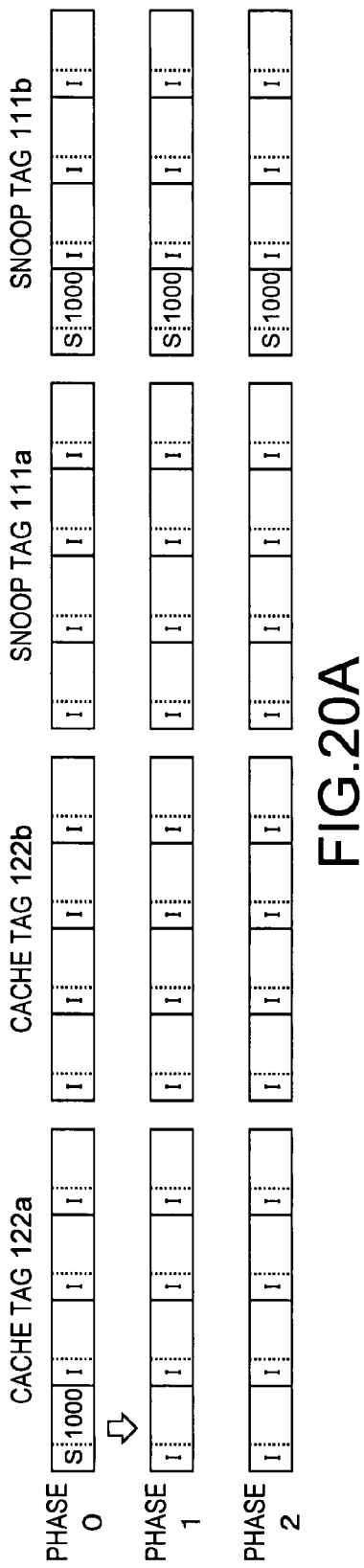
FIGS. 20A and 20B illustrate examples of a process of extending the cache replacement request.
Figure 20B:
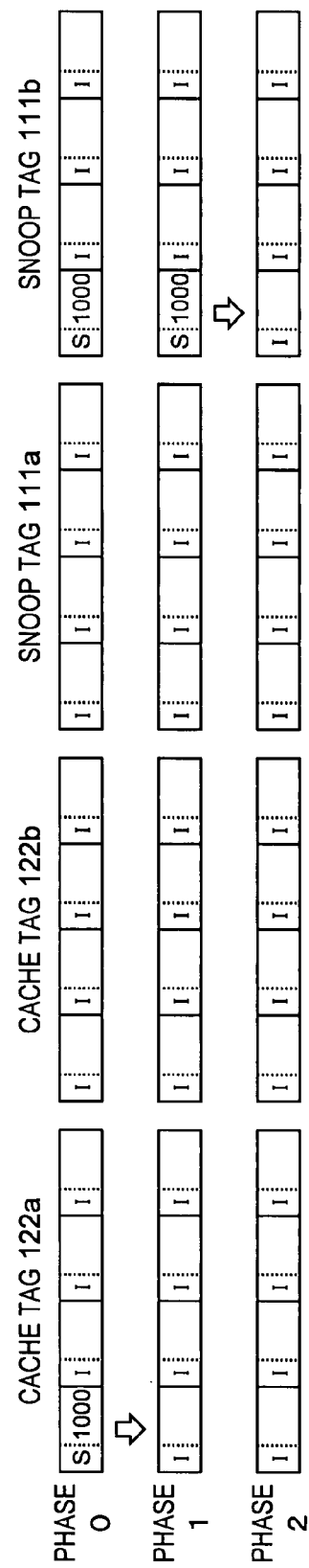

FIGS. 20A and 20B illustrate examples of a process of extending the cache replacement request. Hereinafter, by using FIGS. 20A and 20B, the examples of the process will be described in the case where the CPU 120a has issued the cache replacement request. FIGS. 20A and 20B show examples of one same index in the cache tag 122a, the cache tag 122b, the snoop tag 111a and the snoop tag 111b in the configuration shown in FIG. 1.

FIG. 20A illustrates the example in the case where the process of extending the cache replacement request is not performed. In FIG. 20A, phase 0 shows the statuses of the respective tags at a certain point. Here, the CPU 120a issues the cache replacement request for the block number 1000, and deletes the block number 1000 from the cache tag 122a. The respective tags become the statuses of phase 1.

The system controller 110 receives the cache replacement request from the CPU 120a. However, since the block number 1000 has not been registered in the snoop tag 111a, the system controller 110 does not particularly perform any process. The respective tags become the statuses of phase 2 (unchanged from the statuses of phase 1).

However, in the statuses of phase 2, although the block number 1000 has not been registered in any of the CPU 120a and the CPU 120b connected to the same CPU bus 130a, the block number 1000 remains registered in the snoop tag 111b, which leaves garbage information.

FIG. 20B illustrates the example in the case where the process of extending the cache replacement request is performed in this embodiment. In FIG. 20B, phase 0 shows the statuses of the respective tags at a certain point. Here, the CPU 120a issues the cache replacement request for the block number 1000, and deletes the block number 1000 from the cache tag 122a. At this point, the cache replacement request addressing section 119 in the request handling section 114 of the system controller 110 snoops within the CPU bus 130a, and detects that the block number 1000 has not been registered also in the cache tag 122b in the CPU 120b. The respective tags become the statuses of phase 1.

From a result of the snoop that the block number 1000 has not been registered also in the CPU 120b, the system controller 110 extends the cache replacement request from the CPU 120a to the entire CPU bus 130a, and performs the process, assuming that the cache replacement request has been issued from all of the CPUs 120a and 120b connected to the same CPU bus 130a. Thereby, the block number 1000 in the snoop tag 111b will be deleted. The respective tags become the statuses of phase 2.

In this way, when the CPU 120a has issued the cache replacement request, the inside of the CPU bus 130a to which the CPU 120a having issued the cache replacement request is connected is snooped, and if the address requested for the cache replacement has not been registered also in the other CPU 120b in the CPU bus 130a, the cache replacement request issued from the CPU 120a is extended to the cache replacement request issued from all of the CPUs 120 connected to the CPU bus 130a. Thereby it is possible to prevent the garbage from being left in the snoop tag 111.

Figure 21:
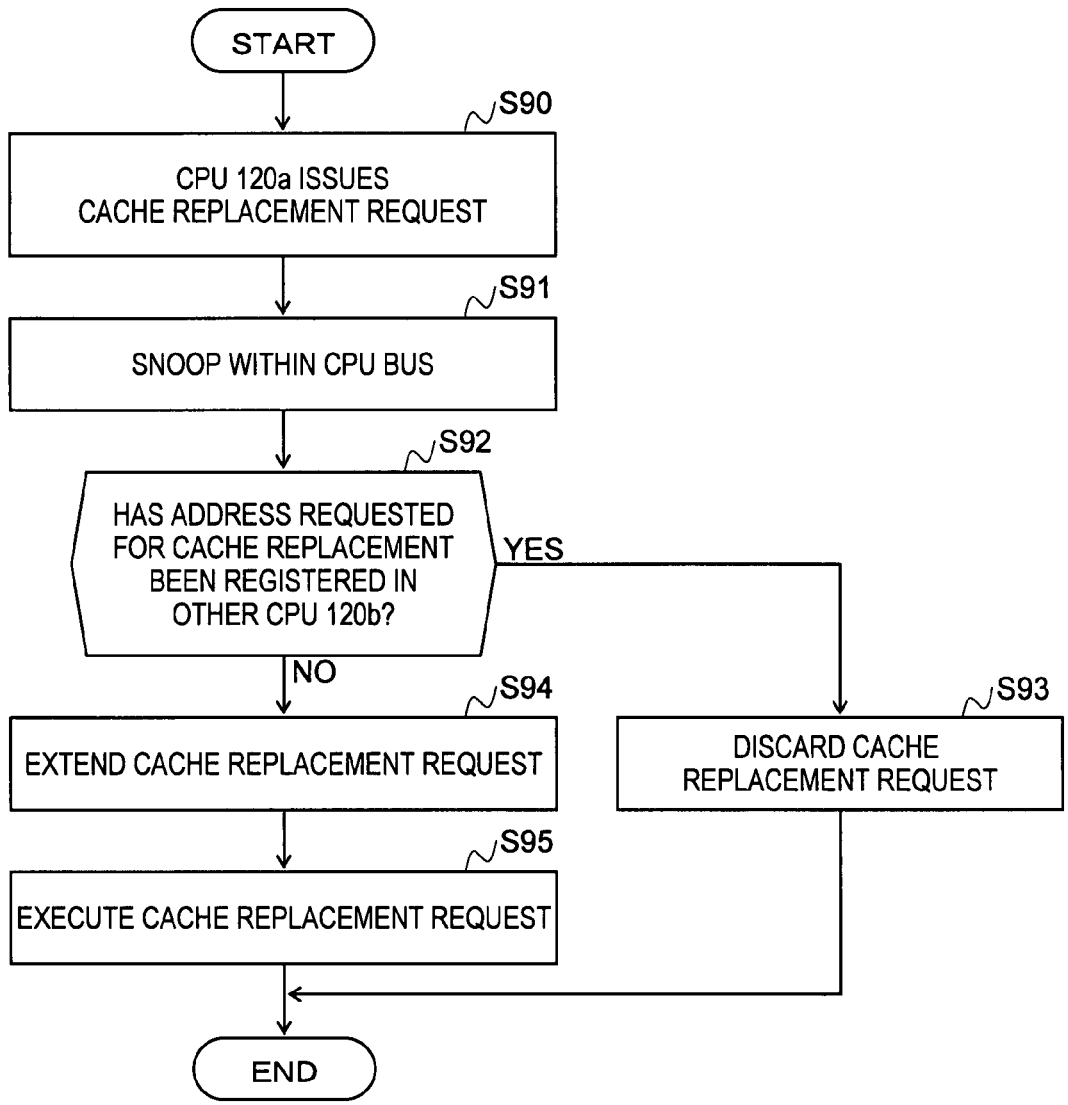
FIG. 21 is a cache replacement request addressing process flowchart according to this embodiment.

FIG. 21 is a cache replacement request addressing process flowchart according to this embodiment. In FIG. 21, it is determined whether or not the address requested for the cache replacement has been registered in the other CPU 120b in the CPU bus 130a to which the CPU 120a having issued the cache replacement request is connected, and the process of invalidating the cache replacement request or the process of extending the cache replacement request is performed.

The CPU 120a issues the cache replacement request (step S90). The inside of the CPU bus 130a, to which the CPU 120a having issued the cache replacement request is connected, is snooped (step S91).

As a result of the snoop, if the address requested for the cache replacement has been registered in the other CPU 120b in the CPU bus 130a (step S92), the cache replacement request from the CPU 120a is discarded (step S93).

As a result of the snoop, if the address requested for the cache replacement has not been registered in the other CPU 120b in the CPU bus 130a (step S92), the cache replacement request from the CPU 120a is extended to the cache replacement request issued from all of the CPUs 120 connected to the CPU bus 130a (step S94), and the cache replacement request is executed (step S95).

Although the cache replacement request addressing section 119 shown in FIG. 3 performs the above described processes, if the snoop tag modification section 118 switches among the snoop tag modification modes including the conventional modification pattern, the cache replacement request addressing section 119 determines whether or not to execute the cache replacement request addressing process. In the case of the conventional modification pattern, the cache replacement request addressing section 119 determines not to execute the cache replacement request addressing process.

Figure 22:
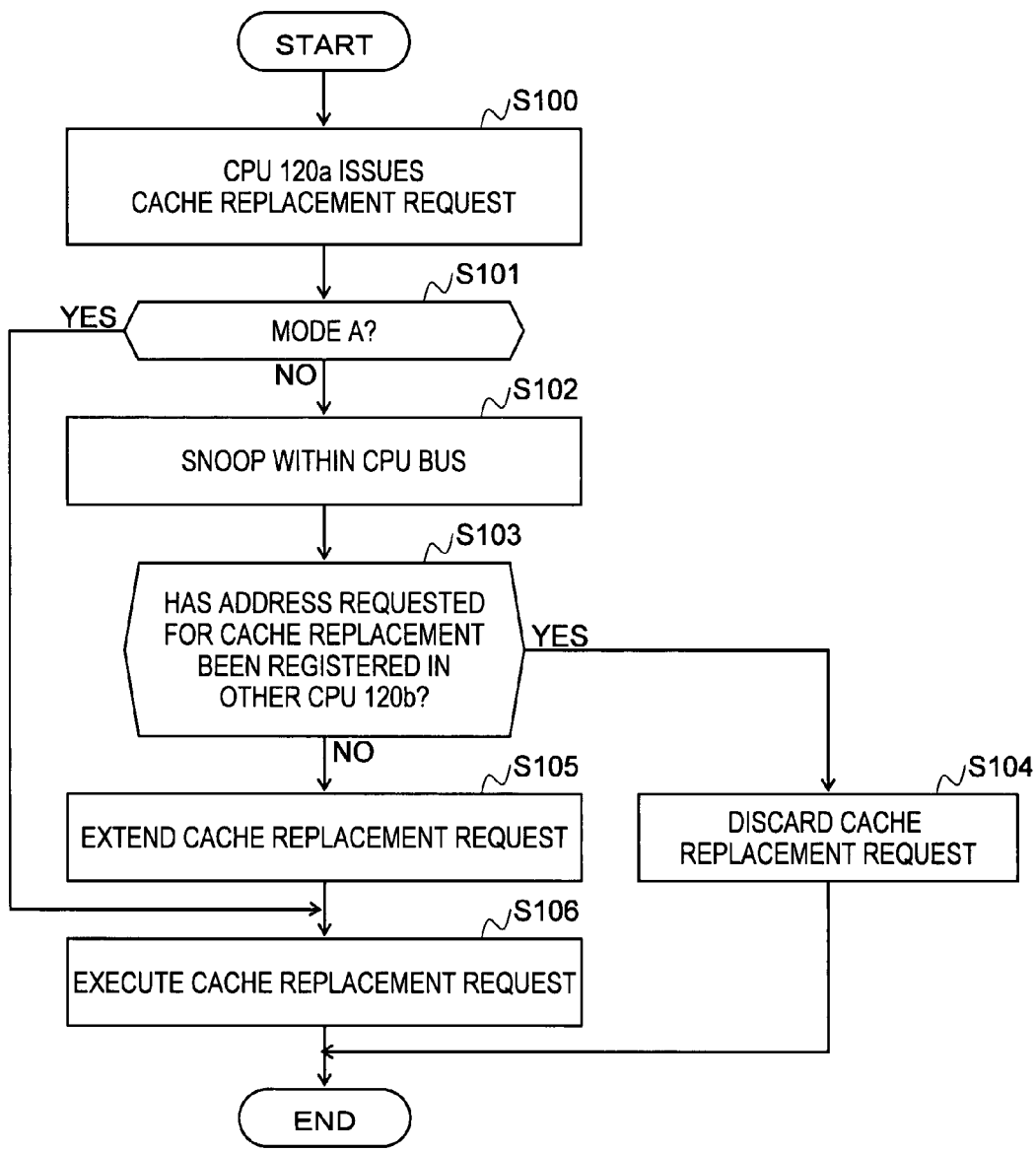
FIG. 22 is a cache replacement request addressing process flowchart in the case where the snoop tag modification mode can be changed.
Figure 23:
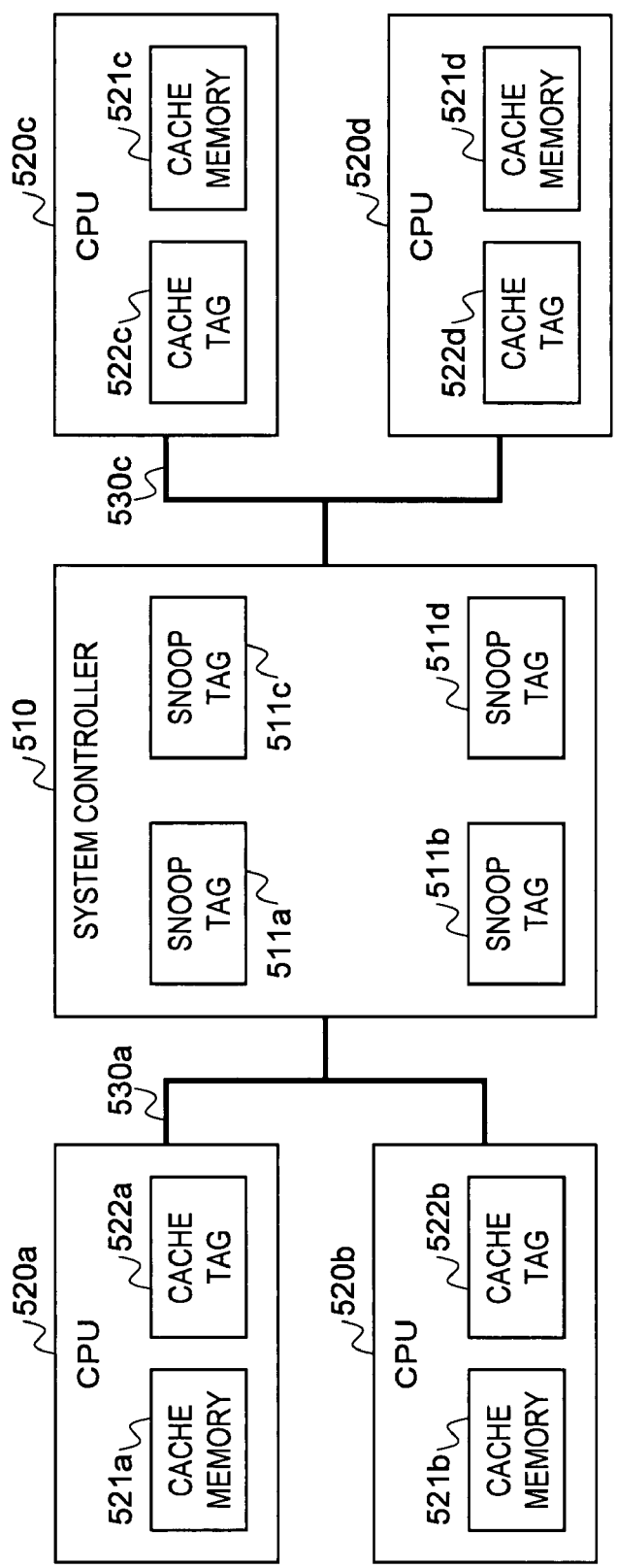
FIG. 23 illustrates an example of a multiprocessor system.
Figure 24:
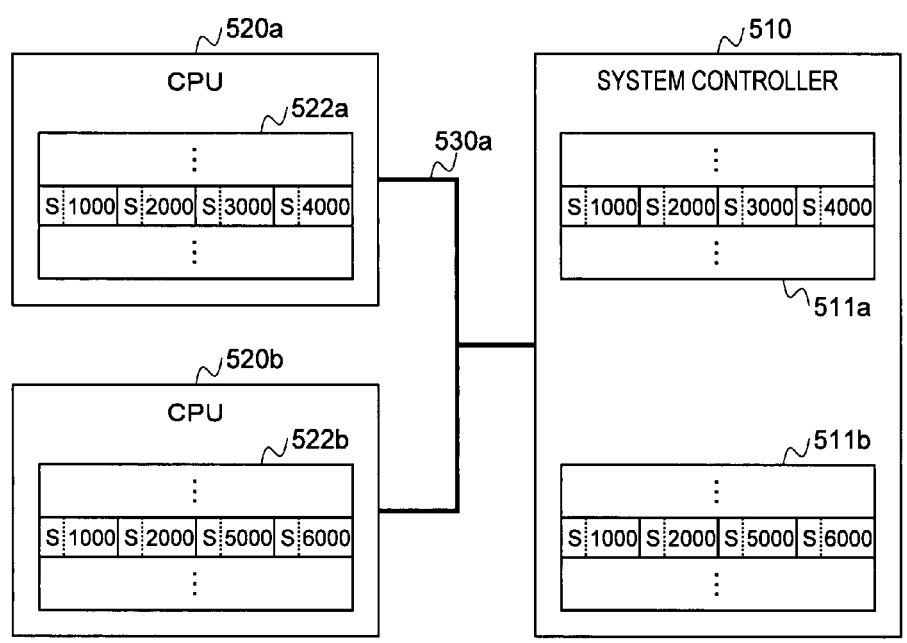
FIG. 24 shows an example of conventional cache tags/snoop tags.
Figure 25:
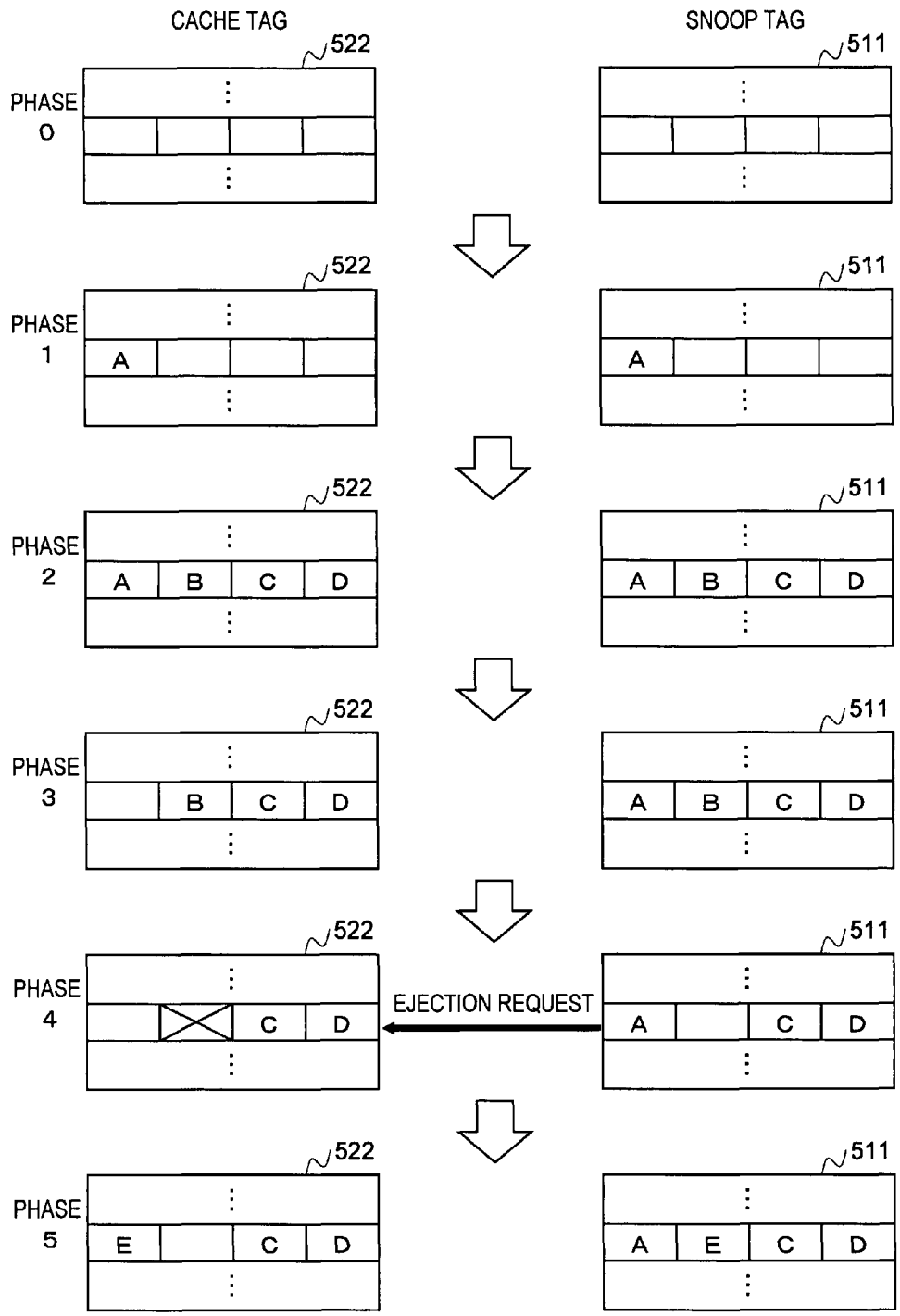
FIG. 25 illustrates Eviction.

FIG. 22 is a cache replacement request addressing process flowchart in the case where the snoop tag modification mode can be changed. In the case of the conventional snoop tag modification, the process of invalidating the cache replacement request or the process of extending the cache replacement request is not required. In FIG. 22, an example of the process will be described in the case where the conventional snoop tag modification and the snoop tag modification of this embodiment can be switched. Here, the conventional snoop tag modification is mode A, the snoop tag modification pattern 1 is mode B, the snoop tag modification pattern 2 is mode C and the snoop tag modification pattern 3 is mode D.

The CPU 120a issues the cache replacement request (step S100). If the snoop tag modification mode is A (step S101), the cache replacement request is executed (step S106).

If the snoop tag modification mode is not A (step S101), the inside of the CPU bus 130a to which the CPU 120a having issued the cache replacement request is connected is snooped (step S102).

As a result of the snoop, if the address requested for the cache replacement has been registered in the other CPU 120b in the CPU bus 130a (step S103), the cache replacement request from the CPU 120a is discarded (step S104).

As a result of the snoop, if the address requested for the cache replacement has not been registered in the other CPU 120b in the CPU bus 130a (step S103), the cache replacement request from the CPU 120a is extended to the cache replacement request issued from all of the CPUs 120 connected to the CPU bus 130a (step S105), and the cache replacement request is executed (step S106).

Hereinabove, although the embodiment of the present invention has been described, the present invention is not limited to the above description. For example, although the example with two CPUs 120 connected to one CPU bus 130 has been described in this embodiment, the present invention may be similarly practiced also with three or more CPUs connected to one CPU bus.

What is claimed is:

1. A system controller for managing a plurality of CPUs including cache memories in a multiprocessor system, the controller comprising:
a snoop tag, for each of said CPUs; is storing a copy of information retained in tags of said cache memories, by said CPUs; and
a request processing section for performing a process with respect to requests from said CPUs,
wherein when a request requiring registration of an address in a shared state in the tag of the cache memory has been issued from one CPU among said plurality of CPUs, in response to the address being registered in the tag of said cache memory of each of the CPUs connected to a same CPU bus, said request processing section performs a snoop tag modification process in which said address to be registered is registered in the shared state in only one of the snoop tags corresponding to the CPUs in which the address is registered.

2. The system controller according to claim 1, wherein when a read request in the shared state has been issued from one CPU among said plurality of CPUs, if an address requested to be read has already been registered in the shared state in the snoop tag corresponding to an other CPU connected to the same CPU bus to which the CPU having issued the read request is connected, said request processing section controls not to register said address requested to be read in the snoop tag corresponding to the CPU having issued the read request.

3. The system controller according to claim 1, wherein when a read request in the shared state has been issued from one CPU among said plurality of CPUs, if an address requested to be read has already been registered in the shared state in the snoop tag corresponding to an other CPU connected to the same CPU bus to which the CPU having issued the read request is connected, said request processing section controls to change an entry of said address in the snoop tag in which the address requested to be read has been registered to an invalid state, and register said address in the snoop tag corresponding to the CPU having issued the read request.

4. The system controller according to claim 1, wherein when a read request in the shared state has been issued from one CPU among said plurality of CPUs, if an address requested to be read has already been registered in the shared state in the snoop tag corresponding to an other CPU connected to the same CPU bus to which the CPU having issued the read request is connected, said request processing section compares numbers of blank entries or numbers of used entries in the snoop tag in which the address requested to be read has been registered and the snoop tag corresponding to the CPU having issued the read request, and depending on a result of the comparison, determines whether to control not to register said address in the snoop tag corresponding to the CPU having issued the read request or to control to change an entry of said address in the snoop tag in which said address has already been registered to an invalid state and register said address in the snoop tag corresponding to the CPU having issued the read request, and performs the snoop tag modification process based on the determination.

5. The system controller according to any of claim 1, wherein when a cache replacement request has been issued from one CPU among said plurality of CPUs, said request processing section snoops the shared state of an other CPU connected to the same CPU bus to which the CPU having issued the cache replacement request is connected, and as a result, if an address requested for the cache replacement has been registered in the shared state in the CPU other than the CPU having issued the cache replacement request, controls to invalidate the issued cache replacement request.

6. The system controller according to any of claim 1, wherein when a cache replacement request has been issued from one CPU among said plurality of CPUs, said request processing section snoops the shared state of an other CPU connected to the same CPU bus to which the CPU having issued the cache replacement request is connected, and as a result, if an address requested for the cache replacement has not been registered in the CPU other than the CPU having issued the cache replacement request, controls to extend the issued cache replacement request to the cache replacement request from all of the CPUs connected to the same CPU bus to which the CPU having issued the cache replacement request is connected.

7. The system controller according to any of claim 1, wherein when a request to change an exclusive state of one address registered in the tag of said cache memory to a shared state has been issued from one CPU among said plurality of CPUs, said request processing section examines whether the address has been registered in the shared state in the snoop tag corresponding to an other CPU connected to the same CPU bus, and if there is the snoop tag in which the address has already been registered in the shared state, performs a snoop tag modification process so that said address is registered in the shared state in only any one of the snoop tags.

8. The system controller according to any of claim 1, wherein when a read request in a shared state has been issued from one CPU among said plurality of CPUs, if the address has already been registered in the tag of said cache memory of each of the CPUs connected to the same CPU bus, said request processing section selects, depending on a mode signal given to said request processing section, at least one of performing a snoop tag modification process of controlling not to register said address requested to be read in the snoop tag corresponding to the CPU having issued the read request, performing a snoop tag modification process of controlling to change an entry of said address in the snoop tag in which the address requested to be read has been registered to an invalid state and register said address in the snoop tag corresponding to the CPU having issued the read request, and performing a snoop tag modification process of registering the address in the shared state in both of the snoop tag in which said address requested to be read has been registered and the snoop tag corresponding to the CPU having issued said read request.

9. A snoop tag modification method performed by a system controller, in a multiprocessor system, for managing a plurality of CPUs including cache memories having tags, the system controller including a snoop tag, for each of said CPUs, storing a copy of information retained in the tags of said cache memories, by said CPUs, the method comprising:

checking the copy information in the snoop tag corresponding to each of the CPUs when a read request in a shared state has been issued from one CPU among said plurality of CPUs, performing a snoop tag modification process, in response to an address being registered in the tag of said cache memory of each of the CPUs connected to the a same CPU bus in which the address to be registered is registered in the shared state in only one of the snoop tags corresponding to the CPUs in which the address is registered.

10. The snoop tag modification method according to claim 9, wherein when a read request in the shared state has been issued from one CPU among said plurality of CPUs, if an address requested to be read has already been registered in the shared state in the snoop tag corresponding to an other CPU connected to the same CPU bus to which the CPU having issued the read request is connected, said performing a snoop tag modification process controls not to register said address requested to be read in the snoop tag corresponding to the CPU having issued the read request.

11. The snoop tag modification method according to claim 9, wherein when a read request in the shared state has been issued from one CPU among said plurality of CPUs, if an address requested to be read has already been registered in the shared state in the snoop tag corresponding to an other CPU connected to the same CPU bus to which the CPU having issued the read request is connected, said performing a snoop tag modification process controls to change an entry of said address in the snoop tag in which the address requested to be read has been registered to an invalid state, and register said address in the snoop tag corresponding to the CPU having issued the read request.

12. The snoop tag modification method according to claim 9, wherein when a read request in the shared state has been issued from one CPU among said plurality of CPUs, if an address requested to be read has already been registered in the shared state in the snoop tag corresponding to an other CPU connected to the same CPU bus to which the CPU having issued the read request is connected, said performing a snoop tag modification process compares numbers of blank entries or numbers of used entries in the snoop tag in which the address requested to be read has been registered and the snoop tag corresponding to the CPU having issued the read request, and depending on a result of the comparison, determines whether to control not to register said address in the snoop tag corresponding to the CPU having issued the read request or to control to change an entry of said address in the snoop tag in which said address has already been registered to an invalid state and register said address in the snoop tag corresponding to the CPU having issued the read request, and performs the snoop tag modification process based on the determination.

13. The snoop tag modification method according to claim 9, wherein when a cache replacement request has been issued from one CPU among said plurality of CPUs, said performing a snoop tag modification process snoops the shared state of an other CPU connected to the same CPU bus to which the CPU having issued the cache replacement request is connected, and as a result, if an address requested for the cache replacement has been registered in the shared state in the CPU other than the CPU having issued the cache replacement request, controls to invalidate the issued cache replacement request.

14. The snoop tag modification method according to claim 9, wherein when a cache replacement request has been issued from one CPU among said plurality of CPUs, said performing a snoop tag modification process snoops the shared state of an other CPU connected to the same CPU bus to which the CPU having issued the cache replacement request is connected, and as a result, if an address requested for the cache replacement has not been registered in the CPU other than the CPU having issued the cache replacement request, controls to extend the issued cache replacement request to the cache replacement request from all of the CPUs connected to the same CPU bus to which the CPU having issued the cache replacement request is connected.

15. The snoop tag modification method according to claim 9, wherein when a request to change an exclusive state of one address registered in the tag of said cache memory to a shared state has been issued from one CPU among said plurality of CPUs, said performing a snoop tag modification process examines whether the address has been registered in the shared state in the snoop tag corresponding to an other CPU connected to the same CPU bus, and if there is the snoop tag in which the address has already been registered in the shared state, performs a snoop tag modification process so that said address is registered in the shared state in only any one of the snoop tags.

16. The snoop tag modification method according to claim 9, wherein when a read request in a shared state has been issued from one CPU among said plurality of CPUs, if the address has already been registered in the tag of said cache memory of each of the CPUs connected to the same CPU bus, said performing a snoop tag modification process selects, depending on a mode signal given to said request processing section, at least one of performing a snoop tag modification process of controlling not to register said address requested to be read in the snoop tag corresponding to the CPU having issued the read request, performing a snoop tag modification process of controlling to change an entry of said address in the snoop tag in which the address requested to be read has been registered to an invalid state and register said address in the snoop tag corresponding to the CPU having issued the read request, and performing a snoop tag modification process of registering the same address in the shared state in both of the snoop tag in which said address requested to be read has been registered and the snoop tag corresponding to the CPU having issued said read request.

17. An information processing apparatus having a plurality of CPUs each including a cache memory and a system controller for managing said plurality of CPUs, the system controller comprises:

a snoop tag having copy information on a tag of said cache memory retained by each CPU, the snoop tag being provided corresponding to each of said plurality of CPUs; and a request processing section for performing a process with respect to requests from said CPUs, wherein when a request requiring registration of an address in a shared state in the tag of the cache memory has been issued from one CPU, in response to the address being registered in the tag of said cache memory of each of the CPUs connected to a same CPU bus, said request processing section performs a snoop tag modification process so that said address is registered in the shared state in only any one of the snoop tags corresponding to the CPUs connected to said same CPU bus.

* * * * *

UNITED STATES PATENT AND TRADEMARK OFFICE
CERTIFICATE OF CORRECTION

PATENT NO.        : 7,779,209 B2                                    Page 1 of 1
APPLICATION NO.   : 11/790263
DATED             : August 17, 2010
INVENTOR(S)       : Takaharu Ishizuka et al.

It is certified that error appears in the above-identified patent and that said Letters Patent is hereby corrected as shown below:

Column 25, Line 7 before "same" delete "a".

Column 26, Line 40 before "address" delete "same".

Signed and Sealed this
Twelfth Day of April, 2011

David J. Kappos
*Director of the United States Patent and Trademark Office*